(12) United States Patent
Valentine et al.

(10) Patent No.: US 11,815,671 B2
(45) Date of Patent: Nov. 14, 2023

(54) FLAT OPTICS FOR IMAGE DIFFERENTIATION

(71) Applicant: Vanderbilt University, Nashville, TN (US)

(72) Inventors: Jason G. Valentine, Nashville, TN (US); You Zhou, Nashville, TN (US); Hanyu Zheng, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 406 days.

(21) Appl. No.: 17/012,189

(22) Filed: Sep. 4, 2020

(65) Prior Publication Data

US 2021/0063717 A1     Mar. 4, 2021

Related U.S. Application Data

(60) Provisional application No. 62/895,804, filed on Sep. 4, 2019.

(51) Int. Cl.
*G02B 21/12* (2006.01)
*G02B 1/00* (2006.01)
(Continued)

(52) U.S. Cl.
CPC ............ *G02B 21/12* (2013.01); *G02B 1/002* (2013.01); *G02B 1/005* (2013.01); *H04N 23/56* (2023.01); *G02B 3/0056* (2013.01); *H04N 23/54* (2023.01)

(58) Field of Classification Search
CPC ........ G02B 1/002; G02B 1/005; G02B 5/008; G02B 1/007; G02B 26/06; G02F 2202/32; G02F 1/292; G02F 2202/30; B82Y 20/00
See application file for complete search history.

(56) References Cited

U.S. PATENT DOCUMENTS

2005/0034071 A1   2/2005   Musgrove et al.
2009/0133117 A1   5/2009   Bentley et al.
(Continued)

OTHER PUBLICATIONS

Guo et al., "Photonic crystal slab Laplace operator for image differentiation", Optica vol. 5, Issue 3, pp. 251-256 (2018) (Year: 2018).*

(Continued)

*Primary Examiner* — Jonathan Y Jung
(74) *Attorney, Agent, or Firm* — Meunier Carlin & Curfman LLC

(57) ABSTRACT

A 2D spatial differentiator operates in transmission and comprises a Si nanorod photonic crystal that can transform an image, Ein, into its second-order derivative, $E_{out} \propto \nabla^2 E_{in}$, allowing for direct discrimination of the edges in the image. The use of a 2D photonic crystal allows for differentiation and edge detection in all directions with a numerical aperture (NA) up to 0.315 and an experimental resolution smaller than 4 μm. The nanophotonic differentiator is able to be directly integrated into an optical microscope and onto a camera sensor, demonstrating the ease with which it can be vertically integrated into existing imaging systems. Furthermore, integration with a metalens is demonstrated for realizing a compact and monolithic image-processing system. In all cases, the use of the nanophotonic differentiator allows for a significant reduction in size compared to traditional systems, opening new doors for optical analog image processing in applications involving computer vision.

18 Claims, 22 Drawing Sheets

(51) Int. Cl.
H04N 23/56 (2023.01)
H04N 23/54 (2023.01)
G02B 3/00 (2006.01)

(56) References Cited

U.S. PATENT DOCUMENTS

| | | | |
|---|---|---|---|
| 2009/0299824 | A1 | 12/2009 | Barnes, Jr. |
| 2010/0185552 | A1 | 7/2010 | Deluca et al. |
| 2013/0246302 | A1 | 9/2013 | Black |
| 2014/0256360 | A1 | 9/2014 | Busch |
| 2014/0258169 | A1 | 9/2014 | Wong et al. |
| 2014/0259189 | A1 | 9/2014 | Ramachandran |
| 2016/0104216 | A1 | 4/2016 | Turner et al. |
| 2018/0075496 | A1 | 3/2018 | Sha |
| 2019/0044003 | A1* | 2/2019 | Heck ............... G02B 1/002 |
| 2019/0385071 | A1 | 12/2019 | Vonbencke et al. |
| 2020/0176943 | A1* | 6/2020 | Kante ............... H01S 5/1071 |
| 2020/0240913 | A1* | 7/2020 | Burg ............... B01L 3/5027 |

OTHER PUBLICATIONS

Kwon et al., "Nonlocal metasurfaces for optical signal processing", Physical Review Letters, 2018, 121(17): 173004 (Year: 2018).*
Supplementary material from Guo et al., "Photonic crystal slab Laplace operator for image differentiation", Optica vol. 5, Issue 3, pp. 251-256 (2018) (Year: 2018).*
Alù, A. & Engheta, N. Performing Methematical Operations with Metamaterials. Science, 160-164 (2014).
Arbabi, A., Horie, Y., Ball, A. J., Bagheri, M. & Faraon, A. Subwavelength-thick lenses with high numerical apertures and large efficiency based on high-contrast transmitarrays. Nat. Commun. 6, 7069 (2015).
Brosnan, T. & Sun, D.-W. Improving quality inspection of food products by computer vision—a review. J. Food Eng. 61, 3-16 (2004).
Bykov, D. A., Doskolovich, L. L., Bezus, E. A. & Soifer, V. A. Optical computation of the Laplace operator using phase-shifted Bragg grating. Opt. Express 22, 25084 (2014).
Canny, J. A computational approach to edge detection. IEEE Trans. Pattern Anal. Mach. Intell. 8, 679-698 (1986).
Canny, J. A Computational Approach to Edge Detection. Readings Comput. Vis. 184-203 (1987). doi:10.1016/B978-0-08-051581-6.50024-6.
Cardullo, R. A. Fundamentals of Image Processing in Light Microscopy. 72, 217-242 (2004).
Cordaro, A. et al. High-index dielectric metasurfaces performing mathematical operations. Nano Lett. 19, 8418-8423 (2019).
Fan, S. & Joannopoulos, J. D. Analysis of guided resonances in photonic crystal slabs. Phys. Rev. B 65, 235112 (2002).
Fürhapter, S., Jesacher, A., Bernet, S. & Ritsch-Marte, M. Spiral phase contrast imaging in microscopy. Opt. Express 13, 689-694 (2005).
Gebäck, T. & Koumoutsakos, P. Edge detection in microscopy images using curvelets. BMC Bioinformatics 10, 75 (2009).
Guo, C., Xiao, M., Minkov, M., Shi, Y. & Fan, S. Photonic crystal slab Laplace operator for image differentiation. Optica 5, 251 (2018).
Hsu, C. W., Zhen, B., Stone, A. D., Joannopoulos, J. D. & Soljacic, M. Bound states in the continuum. Nat. Rev. Mater 1, 16048 (2016).
Hsu, H.-S. & Tsai, W.-H. Moment-preserving edge detection and its application to image data compression. Opt. Eng. 32, 1596 (1993).
Joannopoulos, J. D., Villeneuve, P. R. & Fan, S. Photonic crystals putting a new twist on light. Nature 386, 143-149 (1997).
Khorasaninejad, M. et al. Metalenses at visible wavelengths: diffraction-limited focusing and subwavelength resolution imaging. Science 352, 1190-1194 (2016).
Krivenkov, V. I. Guided modes in photonic crystal fibers. Dokl. Phys. 48, 414-417 (2003).
Kwon, H., Sounas, D., Cordaro, A., Polman, A. & Alù, A. Nonlocal Metasurfaces for Optical Signal Processing. Phys. Rev. Lett. 121, 173004 (2018).
Lee, J. et al. Observation and differentiation of unique high-Q optical resonances near zero wave vector in macroscopic photonic crystal slabs. Phys. Rev. Lett. 109, 067401 (2012).
Lin, Z., Groever, B., Capasso, F., Rodriguez, A. W. & Lončar, M. Topology-Optimized Multilayered Metaoptics. Phys. Rev. Appl. 9, 044030 (2018).
Liu, Z. S., Tibuleac, S., Shin, D., Young, P. P. & Magnusson, R. High-efficiency guidedmode resonance filter. Opt. Lett. 23, 1556 (1998).
Mainberger, M. & Weickert, J. Edge-Based Image Compression with Homogeneous Diffusion. in 476-483 (Springer, Berlin, Heidelberg, 2009). doi: 10.1007/978-3-642-03767-258.
Marr, D. & Hildreth, E. Theory of edge detection. Proc. R. Soc. Lond. B 207, 187-217 (1980).
Moitra, P. et al. Large-Scale All-Dielectric Metamaterial Perfect Reflectors. ACS Photonics 2, 692-698 (2015).
Molesky, S. et al. Outlook for inverse design in nanophotonics. Nat. Photonics 12, 659-670 (2018).
Oskooi, A. F. et al. Meep: A flexible free-software package for electromagnetic simulations by the FDTD method. Comput. Phys. Commun. 181, 687-702 (2010).
Phan, T. et al. High-efficiency, large-area, topology-optimized metasurfaces. Light Sci. Appl. 8, 48 (2019).
Sell, D., Yang, J., Doshay, S., Yang, R. & Fan, J. A. Large-Angle, Multifunctional Metagratings Based on Freeform Multimode Geometries. Nano Lett. 17, 3752-3757 (2017).
Solli, D. R. & Jalali, B. Analog optical computing. Nat. Photon. 9, 704-706 (2015).
Suh, W., Yanik, M. F., Solgaard, O. & Fan, S. Displacement-sensitive photonic crystal structures based on guided resonance in photonic crystal slabs. Appl. Phys. Lett. 82, 1999-2001 (2003).
Winn, J. N., Fink, Y., Fan, S. & Joannopoulos, J. D. Omnidirectional reflection from a one-dimensional photonic crystal. Opt. Lett. 23, 1573 (1998).
Xu, L. et al. Dynamic nonlinear image tuning through magnetic dipole quasi-BIC ultrathin resonators. Adv. Sci. 6, 1802119 (2019).
Yu, N. et al. Light Propagation with Phase Discontinuities Reflection and Refraction. Science, 334, 333-337 (2011).
Zhou, J. et al. Optical edge detection based on high-efficiency dielectric metasurface. Proc. Natl Acad. Sci. USA 116, 11137-11140 (2019).
Zhou, W. et al. Progress in 2D photonic crystal Fano resonance photonics. Prog. Quantum Electron. 38, 1-74 (2014).
Zhou, Y. et al. Multifunctional metaoptics based on bilayer metasurfaces. Light Sci. Appl. 8, 80 (2019).
Zhou, Y. et al. Multilayer noninteracting dielectric metasurfaces for multiwavelength metaoptics. Nano Lett. 18, 7529-7537 (2018).
Zhu, T. et al. Generalized spatial differentiation from the spin Hall effect of light and its application in image processing of edge detection. Phys. Rev. Appl. 11, 034043 (2019).
Zhu, T. et al. Plasmonic computing of spatial differentiation. Nat. Commun. 8, 1-6, 15391 (2017).

* cited by examiner

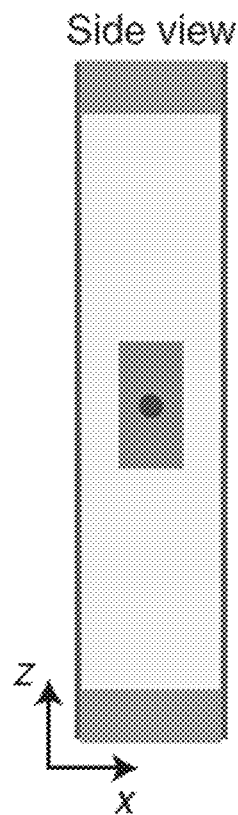 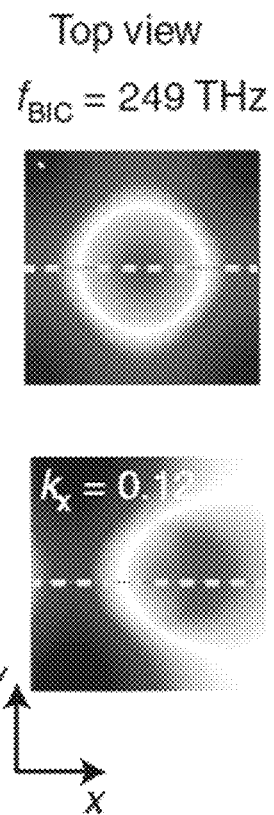 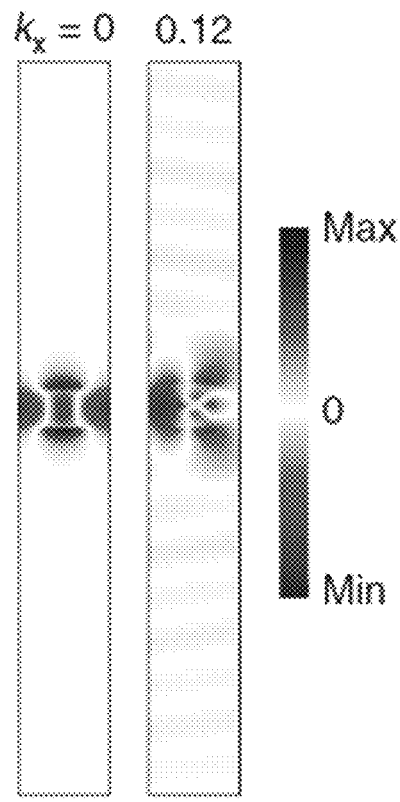
FIG. 1H    FIG. 1I    FIG. 1J
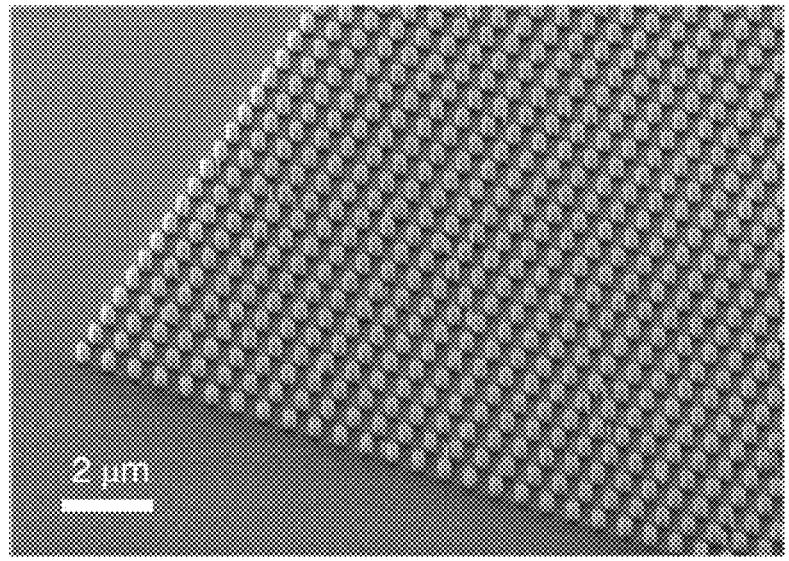
FIG. 2A

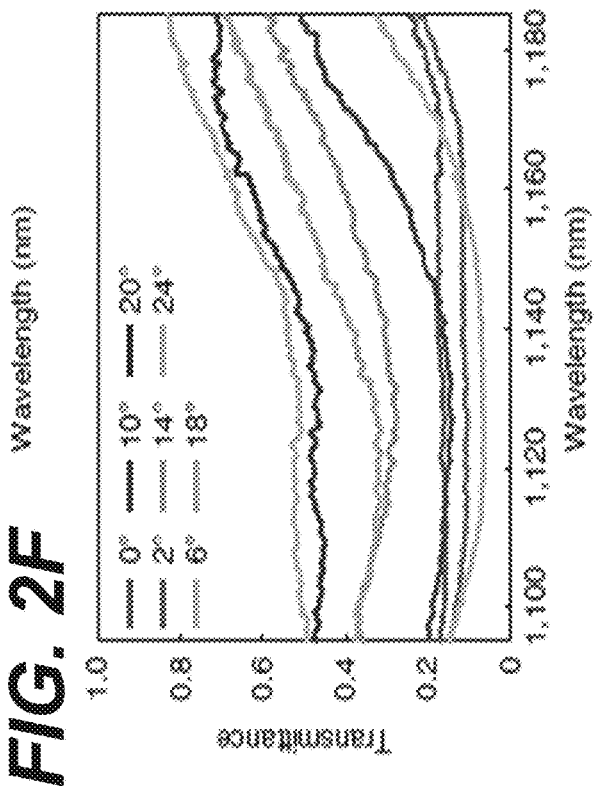
FIG. 2B
FIG. 2C
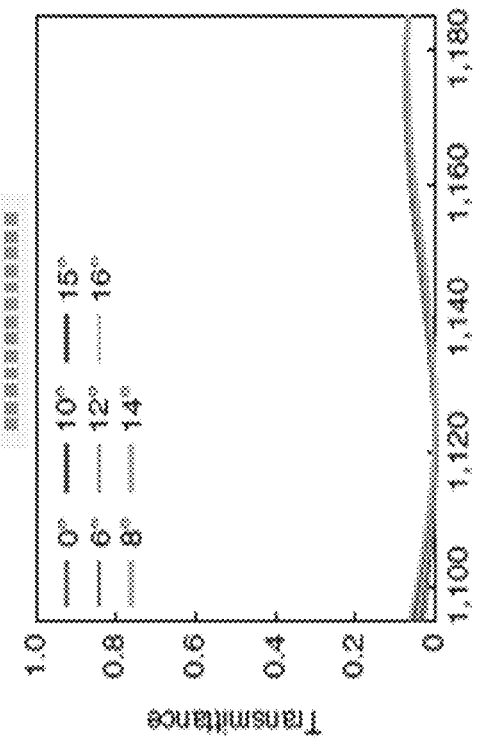
FIG. 2E
FIG. 2F

FIG. 2H  FIG. 2I

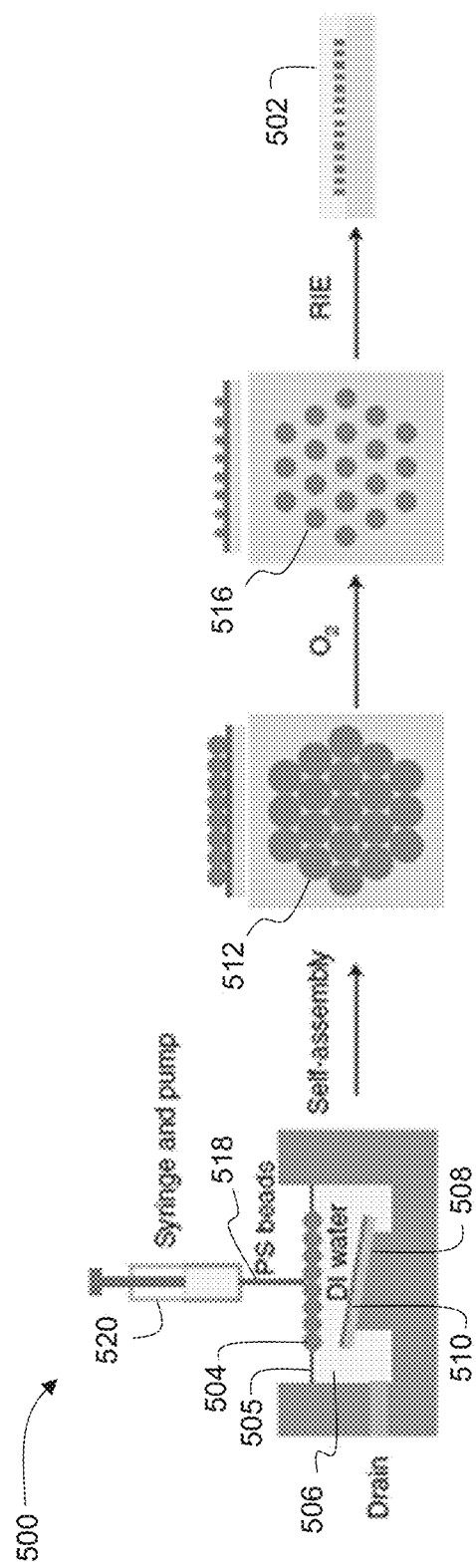
FIG. 5A
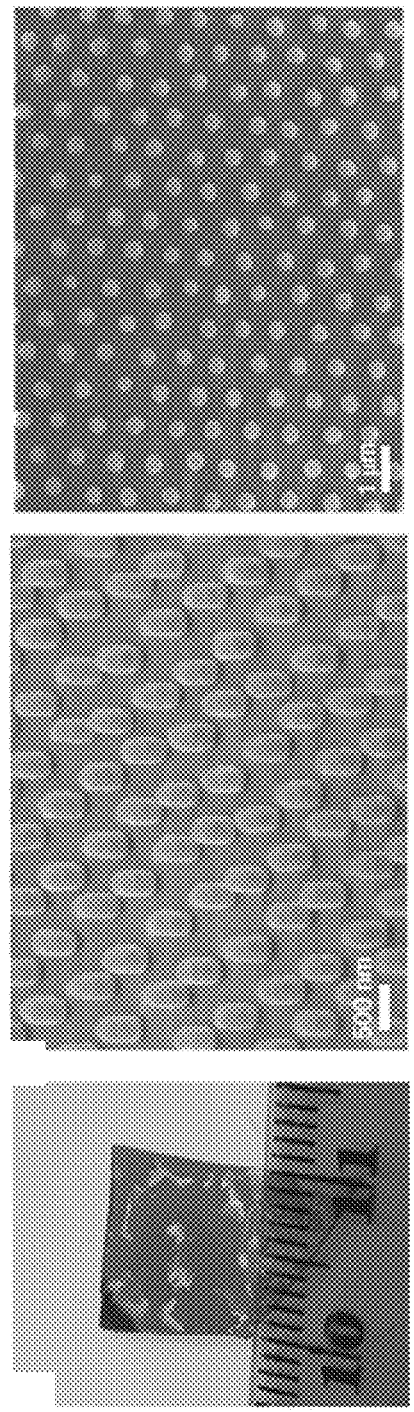
FIG. 5B
FIG. 5C

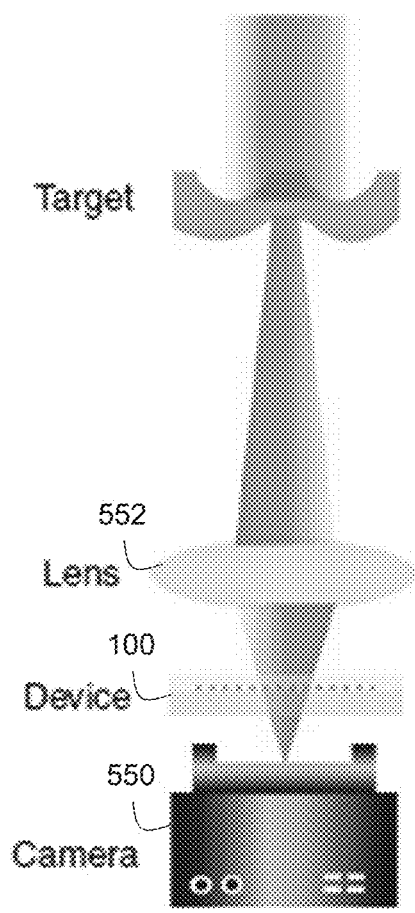
FIG. 5D
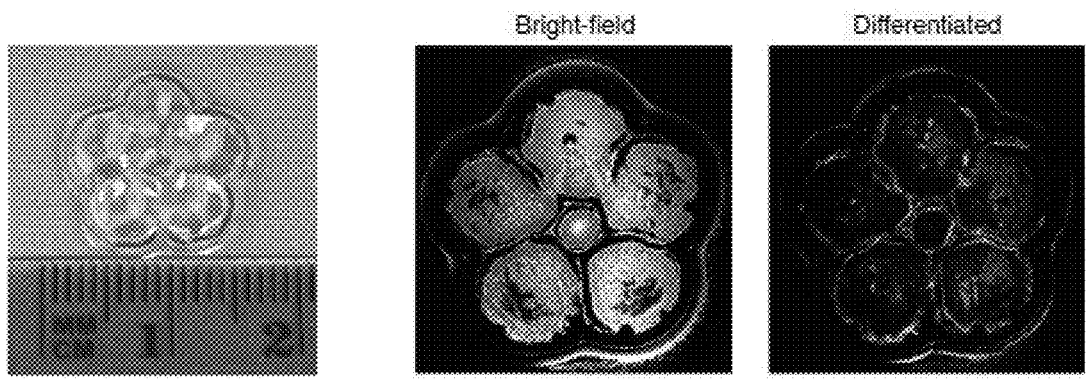
FIG. 5E  FIG. 5F

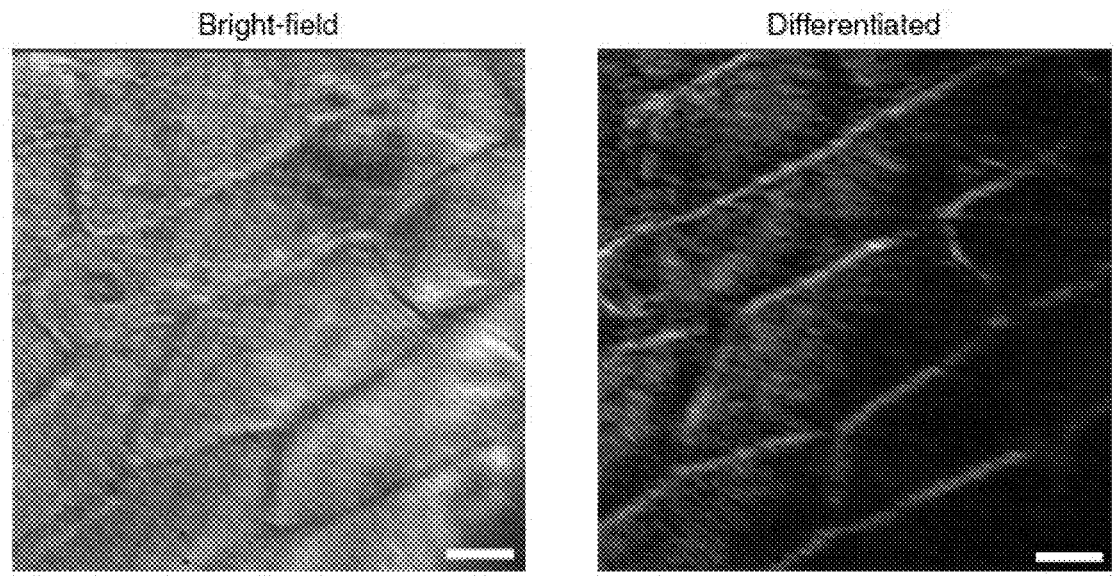
FIG. 6E
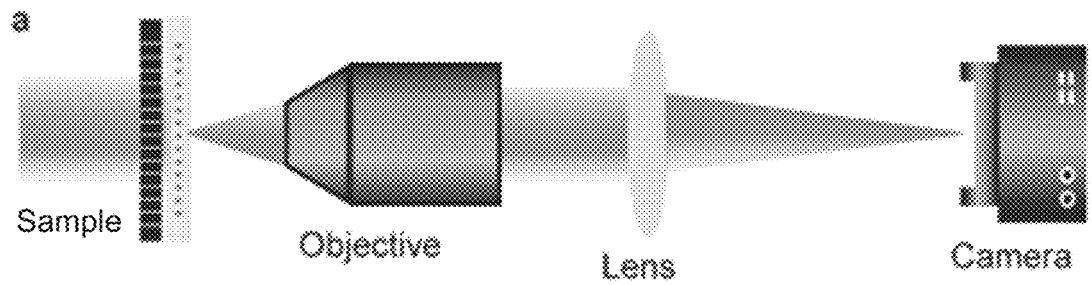
FIG. 8A
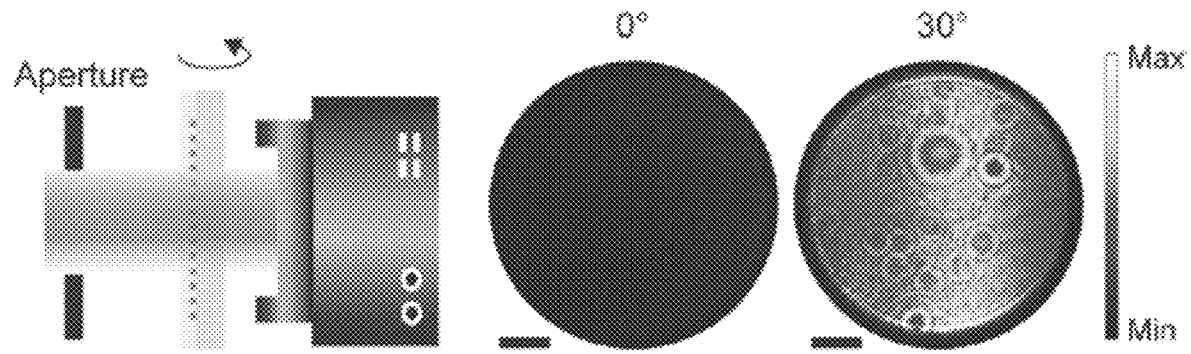
FIG. 9A   FIG. 9B   FIG. 9C

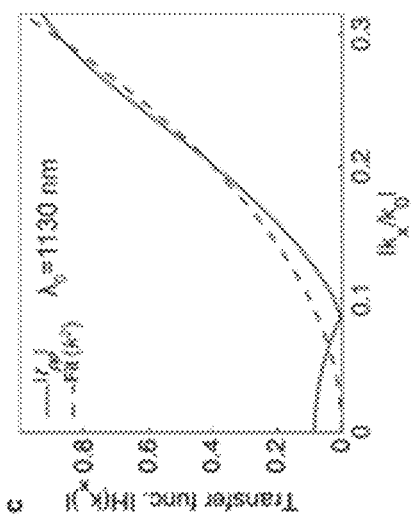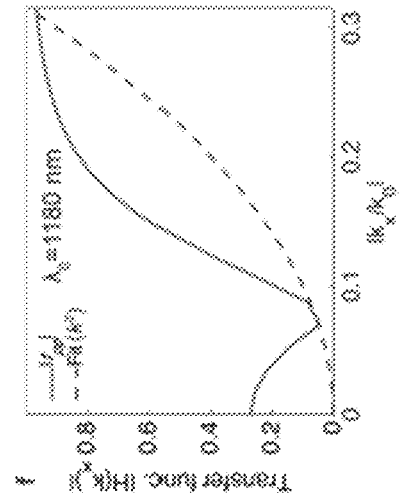
FIG. 7A  FIG. 7B  FIG. 7C
FIG. 7D  FIG. 7E  FIG. 7F

FLAT OPTICS FOR IMAGE DIFFERENTIATION

CROSS REFERENCE TO RELATED APPLICATIONS

This application claims priority to U.S. Provisional Patent Application Ser. No. 62/895,804 filed Sep. 4, 2019, the disclosure of which is expressly incorporated herein by reference.

GOVERNMENT LICENSE RIGHTS

This invention was made with government support under grant N00014-18-1-2568 awarded by the Office of Naval Research and under contract HR001118C0015 awarded by the Defense Advanced Threat Reduction Agency. The government has certain rights in the invention.

BACKGROUND

Imaging processing is a critical and rapidly advancing technology for various science and engineering disciplines, with ever more complex digital tools opening the door to new avenues in biological imaging, three-dimensional (3D) reconstruction and autonomous cars. Edge-based enhancement is particularly useful for data compression, object inspection, microscopy and general computer vision. Edge-based enhancement is accomplished using spatial differentiation, which can be based on either electronic or optical architectures. Although digital circuits are able to perform complex data processing, there are limitations due to computation speed and power consumption. Optical analog computation, with the ability to process information directly using the optical signal, provides an alternative approach to perform large-scale and real-time data processing with minimal, if any, power consumption.

Traditionally, analog image differentiation has been performed using Fourier methods based on lenses and filter systems. However, the use of multiple conventional lenses, such as those found in 4f Fourier filtering, results in a large form factor that is not compatible with compact integrated systems.

SUMMARY

A first aspect of the disclosure provides a flat photonic differentiator. The differentiator comprises a substrate, a photonic crystal, and a cladding layer. The photonic crystal comprises a two-dimensional array of resonators positioned on the substrate. Each of the resonators has a first refractive index, a width, a height, and is centered in a unit cell of the substrate with a length. The cladding layer has a second refractive index and is positioned on the substrate. The resonators are embedded within the cladding layer. The width, the height, the length, the first refractive index, and the second refractive index are configured to realize an optical transfer function for transmitted light through the photonic differentiator to produce a spatially differentiated image.

In some implementations of the first aspect of the disclosure, the width, height, length, first refractive index, and second refractive index are related by $$[D, a, h] = \left(\frac{\lambda_0}{n_{avg}}\right) * [i, j, k],$$

where D is the width, a is the length, h is the height, $\lambda_0$ is the free space wavelength of a working frequency of the differentiator, $n_{avg}$ is an average of the first refractive index and the second refractive index, and i, j, and k are dimensional constants for the width, length, and height, respectively.

In some implementations of the first aspect of the disclosure, [i, j, k]=[0.63, 1.35, 0.99], and wherein each of $\lambda_0$, $n_{avg}$, i, j, and k have a tolerance of +/−20%.

In some implementations of the first aspect of the disclosure, the spatially differentiated image is a second-order derivative of an input image received by the photonic differentiator.

In some implementations of the first aspect of the disclosure, the photonic crystal has a numerical aperture greater than 0.3.

In some implementations of the first aspect of the disclosure, the photonic crystal does not perform polarization conversion for the transmitted light.

In some implementations of the first aspect of the disclosure, the photonic crystal supports quasi-guided modes for p-polarized incident light.

In some implementations of the first aspect of the disclosure, the photonic crystal reflects s-polarized incident light.

In some implementations of the first aspect of the disclosure, the photonic crystal transmits a brightfield image of incident light with a wavelength more than a threshold difference than the working wavelength.

In some implementations of the first aspect of the disclosure, the working wavelength is one or more wavelengths within a range of 100 nm of each other.

In some implementations of the first aspect of the disclosure, a refractive index of the substrate is within 10% of the second refractive index.

In some implementations of the first aspect of the disclosure, a cross-sectional shape of each of the resonators is selected from the group consisting of: a circle, a hexagon, a square, a triangle, and a regular polygon.

A second aspect of the disclosure provides an imaging system that comprises an illumination source and a photonic differentiator. The illumination source is configured to selectively transmit illumination light at a first wavelength. The photonic differentiator positioned to receive light of a scene illuminated by the illumination light. The photonic differentiator comprises a substrate, a photonic crystal, and a cladding layer. The photonic crystal comprising a two-dimensional array of resonators positioned on the substrate. Each of the resonators has a first refractive index, a width, a height, and is centered in a unit cell of the substrate with a length. The cladding layer has a second refractive index and is positioned on the substrate, wherein the resonators are embedded within the cladding layer. The width, height, length, first refractive index, second refractive index, and third refractive index are configured to realize an optical transfer function in transmitted light through the photonic differentiator to produce a spatially differentiated image of the scene when illuminated by illumination light at the first wavelength.

In some implementations of the second aspect of the disclosure, the imaging system further comprises an image sensor configured to capture the spatially differentiated image of the scene. The photonic differentiator is positioned between the scene and the image sensor.

In some implementations of the second aspect of the disclosure, the imaging system further comprises an objective of a microscope. The photonic differentiator is positioned between the scene and the objective.

In some implementations of the second aspect of the disclosure, the width, height, length, first refractive index, and second refractive index, are related by $$[D, a, h] = \left(\frac{\lambda_0}{n_{avg}}\right) * [i, j, k],$$

where D is the width, a is the length, h is the height, $\lambda_0$ is a free space wavelength of a working wavelength of the differentiator, $n_{avg}$ is an average of the first refractive index and the second refractive index, and i, j, and k are dimensional constants for the width, length, and height, respectively.

In some implementations of the second aspect of the disclosure, the illumination source is configured to selectively transmit illumination light at either the first wavelength or a second wavelength. The photonic crystal transmits a brightfield image of the scene when illuminated by the illumination light with the second wavelength.

In some implementations of the second aspect of the disclosure, the imaging system further comprises a controller configured to cause the illumination source to selectively transmit illumination light of the first wavelength to produce the spatially differentiated image and configured to cause the illumination source to selectively transmit illumination light of the second wavelength to produce the brightfield image.

In some implementations of the second aspect of the disclosure, [i, j, k]=[0.63, 1.35, 0.99], and wherein each of $\lambda_0$, $n_{avg}$, i, j, and k have a tolerance of +/−20%.

In some implementations of the second aspect of the disclosure, the photonic crystal supports quasi-guided modes for p-polarized incident light, and wherein the photonic crystal reflects s-polarized incident light.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1H is a schematic of a simulation model for the bound-state-in-the-continuum (BIC) and quasi-guided modes suitable for implementing the several embodiments of the disclosure.

FIG. 1I is top views of the field profiles showing excitation of the BIC (top) and quasi-guided mode (bottom) suitable for implementing the several embodiments of the disclosure.

FIG. 1J is side views of the field distributions for the BIC (left) and quasi-guided mode (right) suitable for implementing the several embodiments of the disclosure.

FIG. 2A is a scanning electron microscope image of the fabricated silicon photonic crystal suitable for implementing the several embodiments of the disclosure.

FIGS. 2B-2C is a simulated transmission spectra for s and p polarization suitable for implementing the several embodiments of the disclosure.

FIGS. 2E-2F are measured transmission spectra for s-polarized and p-polarized incident light suitable for implementing the several embodiments of the disclosure.

FIG. 2H-2I are extracted 1D modulated transfer function along different azimuthal angles in the horizontal plane suitable for implementing the several embodiments of the disclosure.

FIG. 5A is a fabrication process of a large-scale image differentiator using nanosphere lithography suitable for implementing the several embodiments of the disclosure.

FIG. 5B is an optical image of a centimeter-scale differentiator suitable for implementing the several embodiments of the disclosure.

FIG. 5C is scanning electron microscope images of the silicon rods suitable for implementing the several embodiments of the disclosure.

FIG. 5D is a schematic of the imaging set-up with the large-scale device in front of a near-infrared (NIR) camera sensor suitable for implementing the several embodiments of the disclosure.

FIG. 5E is an optical image of a first plastic flower mould imaging target suitable for implementing the several embodiments of the disclosure.

FIG. 5F is a bright-field and differentiated results for the first target suitable for implementing the several embodiments of the disclosure.

FIG. 6E is imaging results for bright-field and differentiated onion cells with the metaoptic system suitable for implementing the several embodiments of the disclosure.

FIGS. 7A-7F are modulated transfer function and the quadratic fitting between 1100 and 1180 nm suitable for implementing the several embodiments of the disclosure.

FIG. 8A is a schematic of the imaging setup with the differentiator with a field stop suitable for implementing the several embodiments of the disclosure.

FIGS. 9A-9C show details of a transmission map for a differentiator with an operational wavelength of 1,450 nm suitable for implementing the several embodiments of the disclosure.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

One option for significantly reducing the optical system size in comparison to 4f Fourier filtering is to employ nanophotonic materials such as metasurfaces and photonic crystals for optical image processing. For example, it has been shown that multiple metasurfaces can be used to perform a range of mathematical operations and there have been several theoretical proposals for image differentiation using single-layer nanophotonic materials. Furthermore, image differentiation has been experimentally demonstrated using photonic crystals, the spin Hall effect, surface plasmon-based devices and the Pancharatnam-Berry phase. However, these past experimental approaches have been restricted to 1D and some require additional refractive elements (prisms or lenses) for either plasmon coupling or performing a Fourier transform, which negates the advantage of the thin and flat elements.

Figure 1A:
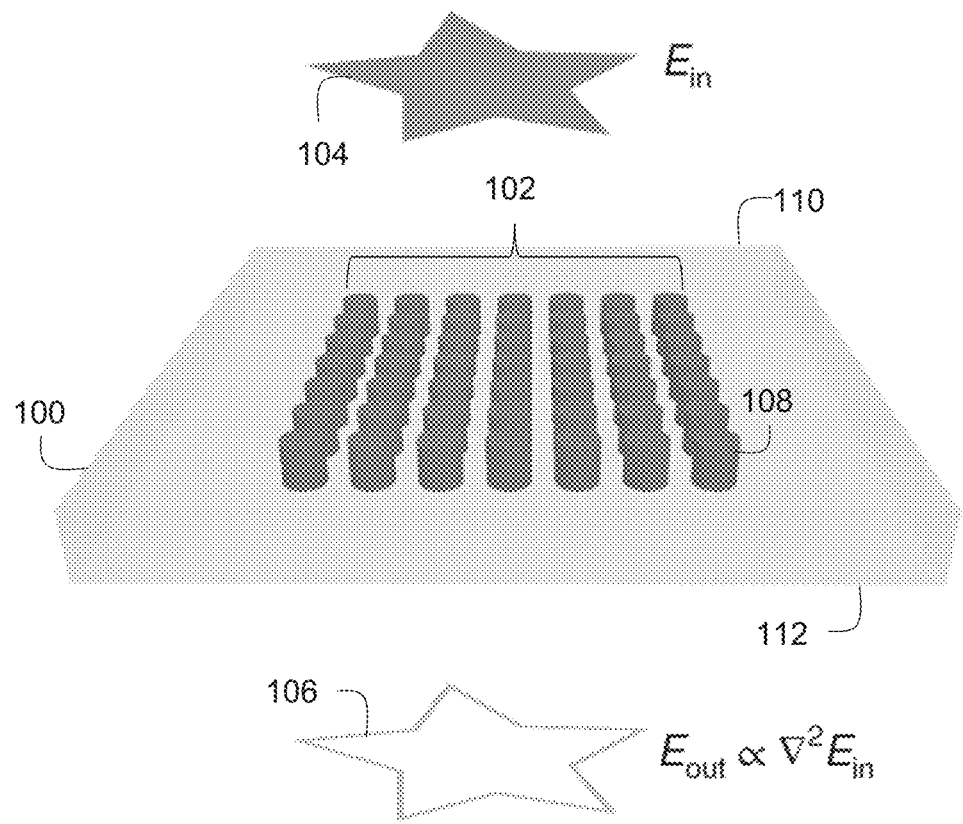
FIG. 1A is a schematic diagram of an optical differentiator comprising a photonic crystal for two-dimensional image differentiation using nanophotonic materials that act as a Laplacian operator that transforms an image into its second-order derivative suitable for implementing the several embodiments of the disclosure.

Disclosed herein is an experimentally demonstrated 2D spatial differentiator that operates in transmission. FIG. 1A is a schematic diagram of an optical differentiator 100 comprising a photonic crystal 102 for two-dimensional image differentiation using nanophotonic materials that act as a Laplacian operator that transforms an image into its second-order derivative suitable for implementing the several embodiments of the disclosure. The differentiator 100 comprises of a Si nanorod photonic crystal 102 that can transform an image, $E_{in}$ 104, into its second-order derivative, $E_{out}$ 106 $\alpha$ $\nabla^2 E_{in}$ 104, allowing for direct discrimination of the edges in the image. The use of a 2D photonic crystal 102 allows for differentiation and edge detection in all directions with a numerical aperture (NA) up to 0.315 and an experimental resolution smaller than 4 μm. Discussed in more detail below, the nanophotonic differentiator 100 is able to be directly integrated into an optical microscope and onto a camera sensor, demonstrating the ease with which it can be vertically integrated into existing imaging systems. Also demonstrated herein, the nanophotonic differentiator 100 may be integrated with a metalens for realizing a compact and monolithic image-processing system. In all cases, the use of the nanophotonic differentiator 100 allows for a significant reduction in size compared to traditional systems, opening new doors for optical analog image processing in applications involving computer vision.

Results

To perform second-order spatial differentiation, an optical filter or material should act as a Laplacian operator on the transmitted light with an electric field profile given by $E_{out}$ $\alpha$ $\nabla^2 E_{in}$, where $\nabla^2$ is given by $$\frac{\partial^2}{\partial x^2} + \frac{\partial^2}{\partial y^2}.$$

In this case the optical transfer function $H(k_x,k_y)$ follows the function:

$$H(k_x, k_y) \equiv \begin{bmatrix} H_{ss}(k_x, k_y) & H_{sp}(k_x, k_y) \\ H_{ps}(k_x, k_y) & H_{pp}(k_x, k_y) \end{bmatrix} \quad \text{Equation (1)}$$

$$= \begin{bmatrix} c_{ss}(k_x^2 + k_y^2) & c_{sp}(k_x^2 + k_y^2) \\ c_{ps}(k_x^2 + k_y^2) & c_{pp}(k_x^2 + k_y^2) \end{bmatrix},$$

where s, p on the first and second subscript denote the polarization of the incident and transmitted light, respectively, and $c_{sp}$ and $c_{ps}$ correspond to polarization conversion. To achieve the required transfer function the photonic crystal slab 102 is used to support quasi-guided modes. Unlike modes guided below the light line, quasi-guided modes are leaky, propagating in a high-index dielectric slab within a light cone. When the frequency, momentum and symmetry match with the quasi-guided modes, Fano interference occurs between the direct transmission and quasi-guided mode, which can lead to near-unity back reflection or transmission. In recent experimental work, Fano interference in 1D photonic crystals has been employed for spatial differentiation and theoretical work has been carried out on 2D photonic crystals for this purpose, although the NA was limited. Here, we employ a 2D design with an NA that is large enough for integration into both traditional and non-traditional imaging systems, allowing for compact optical analog image-processing systems.

Figure 1B:
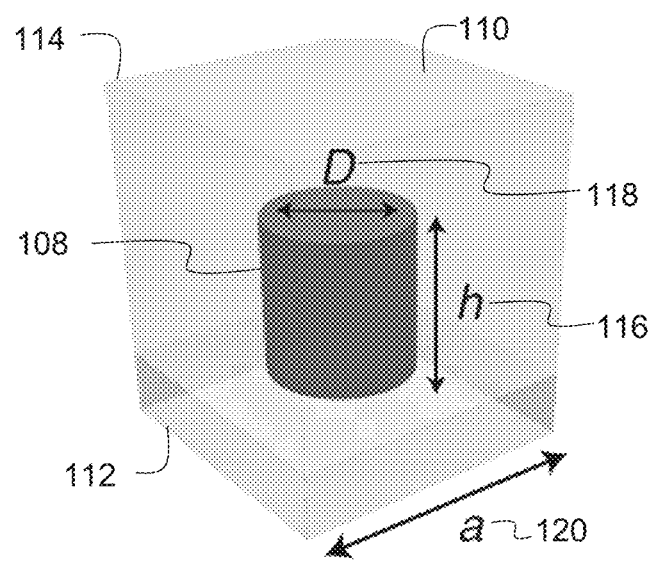
FIG. 1B is a unit cell of the photonic crystal of the differentiator with a silicon nanorod suitable for implementing the several embodiments of the disclosure.

To realize the required transfer function the 2D photonic crystal 102 is composed of resonators 108 embedded in a cladding layer 110 on a substrate 112. FIG. 1B shows a unit cell 114 of the differentiator 100, comprising one of the nanorod resonators 108. Each of the nanorod resonators 108 has a height 116, h, and a width 118, D. Each of the resonators 108 is centered in the unit cell 114, where the unit cell 114 has a length 120, a, sometimes referred to as the period or periodicity of the resonators 108 in the photonic crystal 102. Therefore, the resonators 108 are arranged in a two-dimensional array in the differentiator 100 to form the photonic crystal 102. While a square array with seven resonators 108 on each side is shown, more or fewer resonators 108 may be present. Additionally, the resonators 108 may be arranged in a two-dimensional array (i.e., lattice) with different resonator arrangements to form the photonic crystal 102, such as a rectangular or hexagonal lattice. In various implementations, the resonators 108 may be arranged in a symmetrical lattice to form the photonic crystal 102. Other shapes for the photonic crystal 102 are contemplated by this disclosure.

In the example shown, the resonators 108 are cylindrical silicon (Si) nanorods embedded in a polymethyl methacrylate (PMMA) cladding layer 110 on a silicon dioxide (SiO$_2$) substrate 112. Other materials are contemplated by this disclosure for one or more of the resonators 108, the cladding layer 110, and/or the substrate 108. For example, each of the cladding layer 110 and/or the substrate 112 may be selected to be formed of other transparent materials. The cladding layer 110 may be formed of other transparent polymer or ceramic materials. In general, the material of the cladding layer 110 is selected such that a refractive index of the cladding layer 110 is within 10% of the refractive index of the substrate 112, but a cladding layer of air can be used with a reduction in performance in some implementations.

In the example shown, the height 116 of the cylindrical resonators 108 is 440 nm, the width 118 of the cylindrical resonators (i.e., diameter in this example) is 280 nm, and the resonators 108 are arranged with unit cells 114 with the length 120 of 600 nm (i.e., the resonators 108 are arranged in a lattice with a period of 600 nm to form the photonic crystal 102). While the dimensions in this example correspond with a working frequency of 268 THz (working wavelength $\lambda_0$=1,120 nm), the dimensions of each of the height 116, width 118, and length 120 may be scaled to a desired working frequency. For example, as described in detail below, for a working a wavelength of 740 nm, the width 118 is 180 nm, the length 120 (i.e. period) is 385 nm, and the height 116 is 280 nm. In another example, for an operational wavelength of 1,450 nm, the width 118 is 340 nm, the height 116 is 480 nm, and the length is 740 nm. Each of the dimensions may vary by +/−20% of the values expressed above. In some implementations, the dimensions may be normalized to the operation wavelength. In some implementations, the dimension may further be scaled based on ratios of the refractive indexes of the materials.

More generally, following the design with the 1,120 nm working wavelength, the height 116, the width 118, and the length 120 may be expressed as a function of the operational wavelength of the photonic crystal 102 as:

$$[D, a, h] = \left(\frac{2.5\lambda_0}{n_{avg}}\right) * \left[\frac{280}{1120}, \frac{600}{1120}, \frac{440}{1120}\right] \quad \text{Equation (2)}$$

$$= \left(\frac{\lambda_0}{n_{avg}}\right) * [i, j, k],$$

where $\lambda_0$ is the free space wavelength of a working wavelength for the differentiator 00, $n_{avg}$ is the average of the refractive index of the resonators 108 and the refractive index of the cladding layer 110, i, j, and k are dimensional constants for the width 118, length 120, and height 116, respectively. Herein, [i,j, k]=[0.63, 1.34, 0.99] and each of $\lambda_0$, $n_{avg}$, i, j, and k have a tolerance of +/−20%. In the example above with Si nanorod resonators 108 and a PMMA cladding layer 110, $n_{avg}$=2.5. Therefore, a new differentiator may be redesigned to work at a new working wavelength and/or with different materials and the height 116, the width 118, and the length 120 for the new differentiator may be easily determined using Eq. 2.

In various implementations, each of the height 116, the width 118, and the length 120 may have a structural tolerance with respect to one another. For example, keeping the height 116, and the length 120 constant, the width 118 has a ratio tolerance of 0.85-1.1 of a designed width (e.g., width determined based on Eq. 2 for a given working wavelength). Likewise, keeping the width 118 and the length 120 constant, the height 116 has a ratio tolerance of 0.95-1.2 of a designed height (e.g., height determined based on Eq. 2 for a given working wavelength). Similarly, keeping the height 116 and the width 118 constant, the length 120 has a ratio tolerance of 0.98-1.05 of a designed length (e.g., length determined based on Eq. 2 for a given working wavelength).

While the resonators 108 are shown as having a cylindrical shape (i.e., circular cross-sectional shape) in the examples provided herein, other shapes may be used for the resonators 108. For example, a cross-sectional shape of the resonators 108 may be a hexagon, a square, a triangle, or any other regular polygon.

Figure 1C:
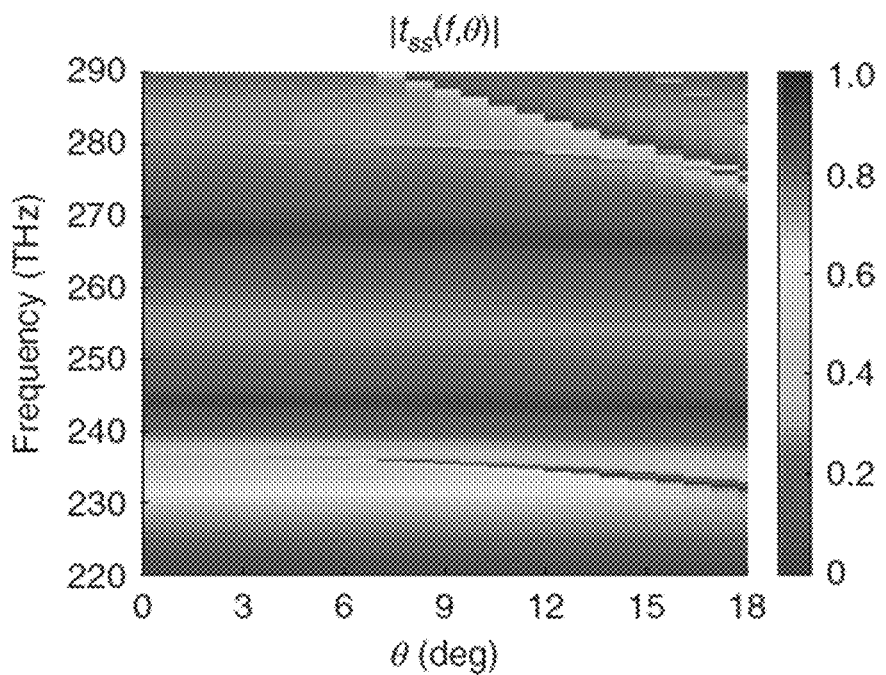
FIGS. 1C-1D are simulated transmission coefficient amplitudes as a function of frequency and incident angle for s and p polarizations suitable for implementing the several embodiments of the disclosure.
Figure 1D:
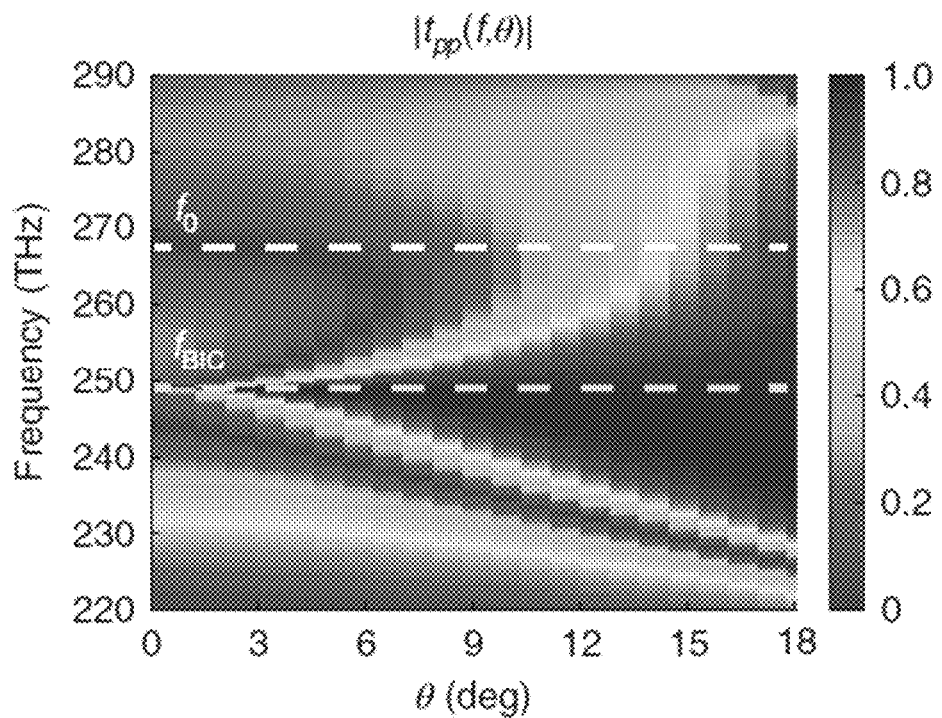

FIGS. 1C-1D are simulated transmission coefficient amplitudes as a function of frequency and incident angle for s and p polarizations suitable for implementing the several embodiments of the disclosure. FIG. 1C shows the simulated transmission coefficient amplitude |t(f, θ)| as a function of frequency and incident angle along the Γ–X direction (φ=0°, where φ is the azimuthal angle in the horizontal plane) for s polarization. FIG. 1D shows the simulated transmission coefficient amplitude |t(f, θ)| as a function of frequency and incident angle along the Γ–X direction (φ=0°) for p polarization. Note that no polarization conversions occurs for the transmitted light.

At normal incidence, two broad transmission dips are observed at 244 and 268 THz, indicating the presence of two Mie resonances with low quality factor. There is also a bound state in the continuum (BIC) at 249 THz, which is completely decoupled from free space at the Γ point due to symmetry protection.

Figure 2D:
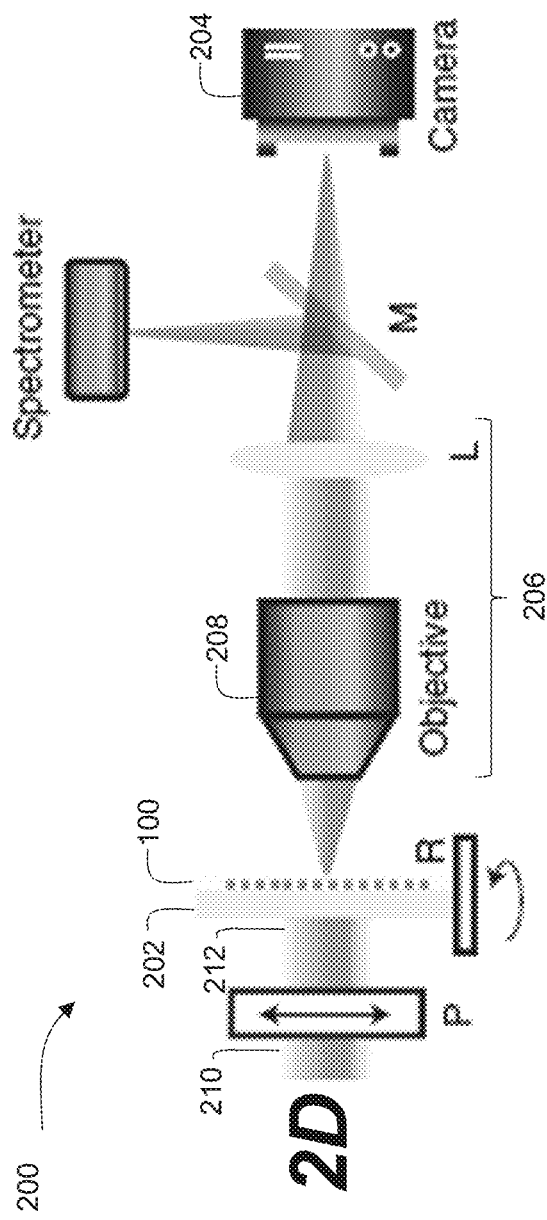
FIG. 2D is an experimental set-up for measuring the transmission spectra at various angles suitable for implementing the several embodiments of the disclosure.

At oblique incidence, the transmission follows a different trend for s and p polarization. Under s polarization, the dipole resonant frequencies remain unchanged as a function of incident angle. The invariant resonance results in no transmitted light for s-polarized input (transmission spectra for s- and p-polarized input at other angles φ are shown in FIGS. 2J-2K). Due to the mirror symmetry of the photonic crystal 102 with respect to the horizontal plane (z=0), regardless of the incident polarization, there is also no s-polarized output based on optical reciprocity, leading to the matrix components $c_{ss}$, $c_{sp}$ and $c_{ps}$ being zero in Equation (1). See, for example, the lack of transmission for s-polarized input at the working wavelength of 1,120 nm in FIG. 2B.

Figure 1E:
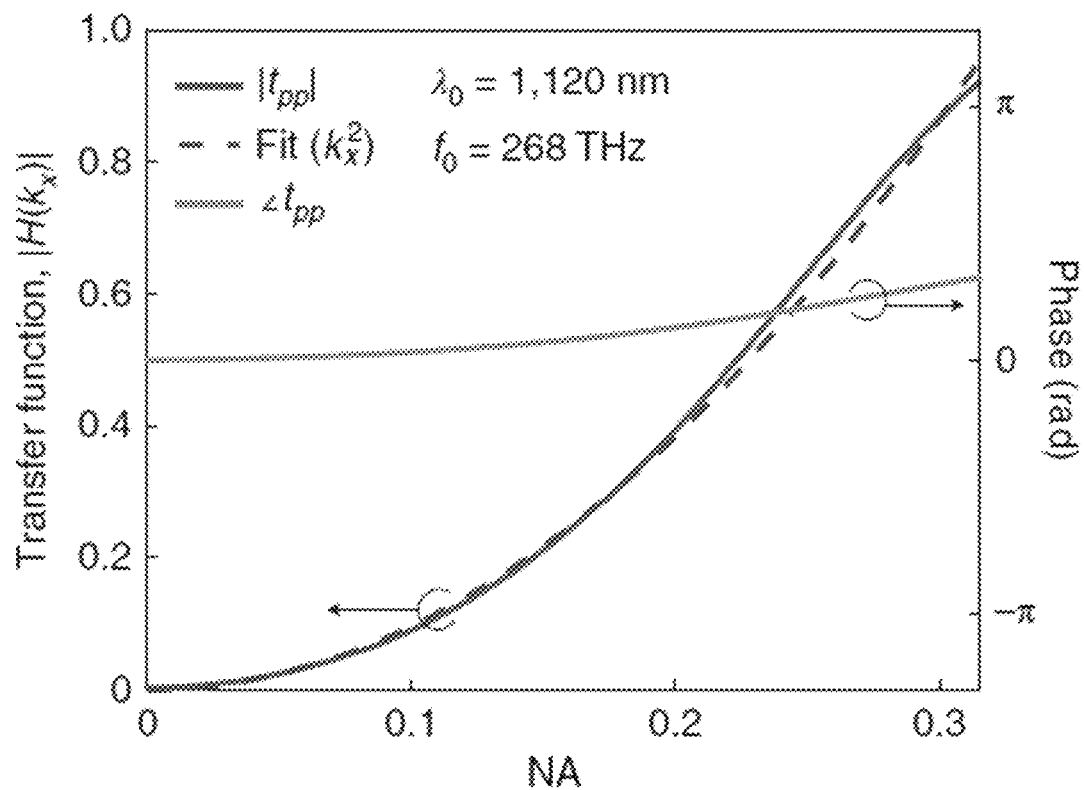
FIG. 1E is an optical transfer function for p polarization at 1,120 nm suitable for implementing the several embodiments of the disclosure.

However, under p-polarization, the BIC resonance begins to couple to free space, becoming quasi-guided with a finite lifetime, and a Fano resonance results in a rapid change in transmittance as the incident angle becomes larger (additional details regarding the response are shown in FIGS. 3F-3K). The working frequency of 268 THz ($\lambda_0$=1,120 nm), which is away from the BIC, was chosen to obtain the proper transfer function. The resulting modulation transfer function |H($k_x$)| and phase along the Γ–X direction for p-polarization are shown in FIG. 1E. FIG. 1E shows the optical transfer function |H($k_x$)| for p-polarization at $\lambda_0$=1,120 nm, and the quadratic fitting in the form of $c_{pp}k_x^2$. Importantly, the modulation transfer function has the required quadratic dependence given by H($k_x$)=$c_{pp}k_x^2$, shown by a fit (dashed line) to the simulated data (dark solid line). The quadratic curve is a near perfect fit (the average deviation of |H($k_x$)| is 1.1%) up to an NA (n$k_x$)=0.315, which equates to an edge resolution on the scale of 2.17 μm (1.94λ). Additionally, the average phase (light solid line) variation ∠H ($k_x$) is 0.34 rad (19°).

Figure 1F:
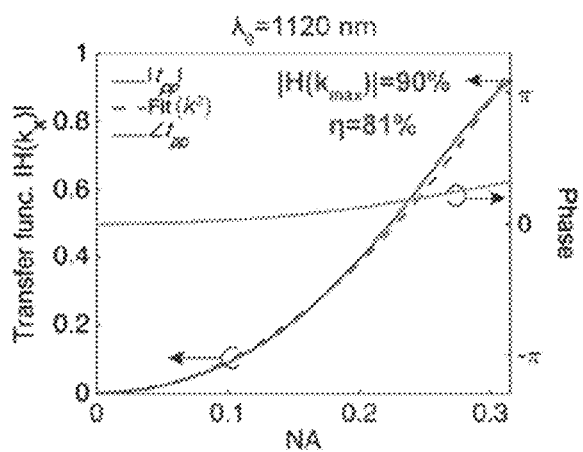
FIG. 1F is an optical transfer function with an efficiency of ~81% at a numerical aperture (NA) of ~0.315 suitable for implementing the several embodiments of the disclosure.
Figure 1G:
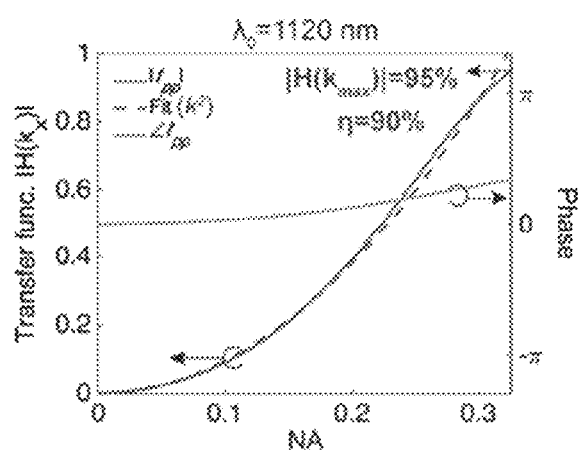
FIG. 1G is an optical transfer function with an efficiency of ~90% at an NA of 0.326 suitable for implementing the several embodiments of the disclosure.

To balance the roles of NA, accuracy of the transfer function, and transmittance for image differentiation, the differentiation efficiency η is defined herein as the square of the transfer function |H($k_x$)|² at the maximum spatial frequencies that can be fitted to the desirable mathematical function (the Laplacian for this work). In this regard, the efficiency can be as high as 81% at an NA=0.315. Because the maximum NA also depends on the fitting accuracy, we can also expand the maximum fitted NA to 0.326 to achieve an efficiency of 90%, at a slight expense to the accuracy (for details of the fitting and a summary of previous work see Table 1 and FIGS. 1F-1G). FIG. 1F shows the optical transfer function |H($k_x$)| along the Γ–X direction, and the quadratic fitting in the form of $c_{pp}k_x^2$. The efficiency |H($k_x$)|² is ~81% at an NA of ~0.315. FIG. 1G shows the optical transfer function |H($k_x$)| along the Γ–X direction, and the quadratic fitting in the form of $c_{pp}k_x^2$. The efficiency |H($k_x$)|² is ~90% at an NA of 0.326.

TABLE 1

| References | NA | Operation | |H($k_{max}$)| | Efficiency η |
|---|---|---|---|---|
| Zhu, T. et al. Plasmonic computing of spatial differentiation. Nat. Commun. 8, 1-6 (2017) | <0.01 | 1D, 1$^{st}$ order | ~40% | ~16% |
| Cordaro, A. et al. High-index dielectric metasurfaces performing mathematical operations. (2019). | 0.35 | 1D, 2$^{nd}$ order | ~100% | ~100% |
| Guo, C., Xiao, M., Minkov, M., Shi, Y. & Fan, S. Photonic crystal slab Laplace operator for image differentiation. Optica 5, 251 (2018). | 0.013 | 2D, 2$^{nd}$ order | <30% | <9% |
| Optical Differentiator Presented Herein | 0.32 | 2D, 2$^{nd}$ order | 95% | 90% |

To better understand the polarization dependence, the profile of the BIC mode as a function of in-plane wavevector is examined. The structure was modelled using a finite-difference time-domain (FDTD) solver (MEEP) by placing an electric dipole, $E_z$ (dot, FIG. 1H), within the slab at the BIC frequency of 249 THz, then the in-plane wavevector was swept long the Γ–X direction, as shown in FIG. 1H. FIG. 1H is a schematic of the simulation model for the bound-state-in-the-continuum (BIC) and quasi-guided modes. Top view of the $E_z$ field profiles are shown in FIG. 1I, showing the excitation of a vertical electric dipole. FIG. 1I is top views of the $E_z$ field profiles showing excitation of the BIC (top) and quasi-guided mode (bottom) at $k_x$=0 and 0.12 (2π/a), respectively. The symmetry plane is denoted by the dashed line (y=0). For a system with a sub-diffractional period, the array of dipoles oscillates in-phase, supporting in-plane radiation completely decoupled from free space. Away from the Γ point, this state starts to become quasi-guided and radiative as the symmetry is no longer protected, as can be seen from the side views of the $E_z$ field distributions in FIG. 1J. FIG. 1J is side views of the $E_z$ field distributions for the BIC ($k_x$=0, left) and quasi-guided mode at $k_x$=0.12 (2π/a, right). Along the Γ–X direction, odd and even modes with respect to the vertical mirror plane (y=0) can be excited by the s and p components, respectively. Based on symmetry considerations, the photonic crystal slab only couples to free-space modes of the same type of symmetry. Thus, the quasi-guided mode, which possess an even symmetry (FIG. 1I), can only be excited by p polarization, leading to an angularly dependent transmission for p polarization while remaining reflective for s polarization. Additional details regarding the theoretical analysis are provided in the section Calculation of angularly-dependent transmission using temporal coupled-mode theory and FIGS. 3F-3K.

To experimentally validate the design, 200×200 μm2 differentiator was fabricated using electron-beam lithography (EBL) in conjunction with reactive ion etching (RIE). The fabricated differentiator is used for characterization of the nanophotonic spatial differentiator. A scanning electron microscopy (SEM) image of the fabricated device with a Si photonic crystal is shown in FIG. 2A. The simulated transmission spectra are presented in FIGS. 2B-2C for s and p polarization, respectively, and a schematic of the measurement set-up is shown in FIG. 2D. FIGS. 2B-2C are simulated transmission spectra along the Γ-X direction for s and p polarization.

FIG. 2D is an experimental set-up 200 for measuring the transmission spectra at various angles. The experimental set-up 200 comprises a polarizer P, a rotation stage R, a tube lens L (f=200 mm), and a flip mirror M. The polarizer P is configurable to polarize incident light 210 to produce s or p polarized light 212. To acquire angle-dependent transmission measurements, a sample 202 with the optical differentiator 100 was mounted on the rotation stage R and imaged by a camera 204 through a magnification system 206 composed of an objective 208 paired with the tube lens L.

FIGS. 2E-2F show the measured transmission spectra at various incident angles under s and p polarized incident light 210, respectively. The incident light is along the Γ-X direction with angles ranging from 0° to 24°. The trend and shape of the measured spectra are in good agreement with the simulation shown in FIGS. 2B-2C.

To map the entire transfer function in k-space, Fourier plane imaging of the device was carried out. The nanophotonic differentiator 100 was illuminated by unpolarized light at a wavelength of 1,120 nm and a ×50 objective (NA=0.42) was used as a condenser with the Fourier images acquired in the back focal plane of a ×20 objective (NA=0.4).

Figure 2G:
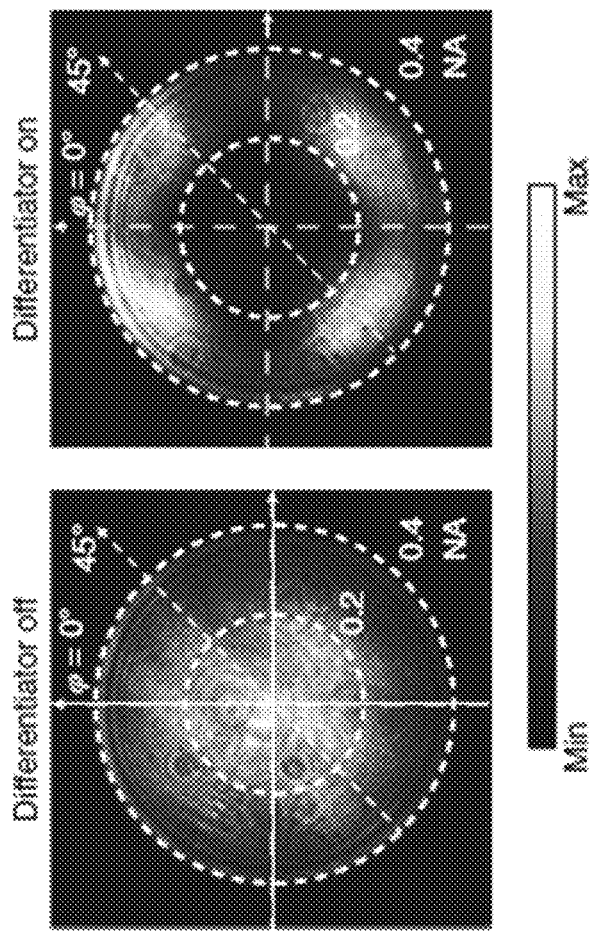
FIG. 2G are measured back focal plane images without and with the nanophotonic differentiator suitable for implementing the several embodiments of the disclosure.
Figure 2J:
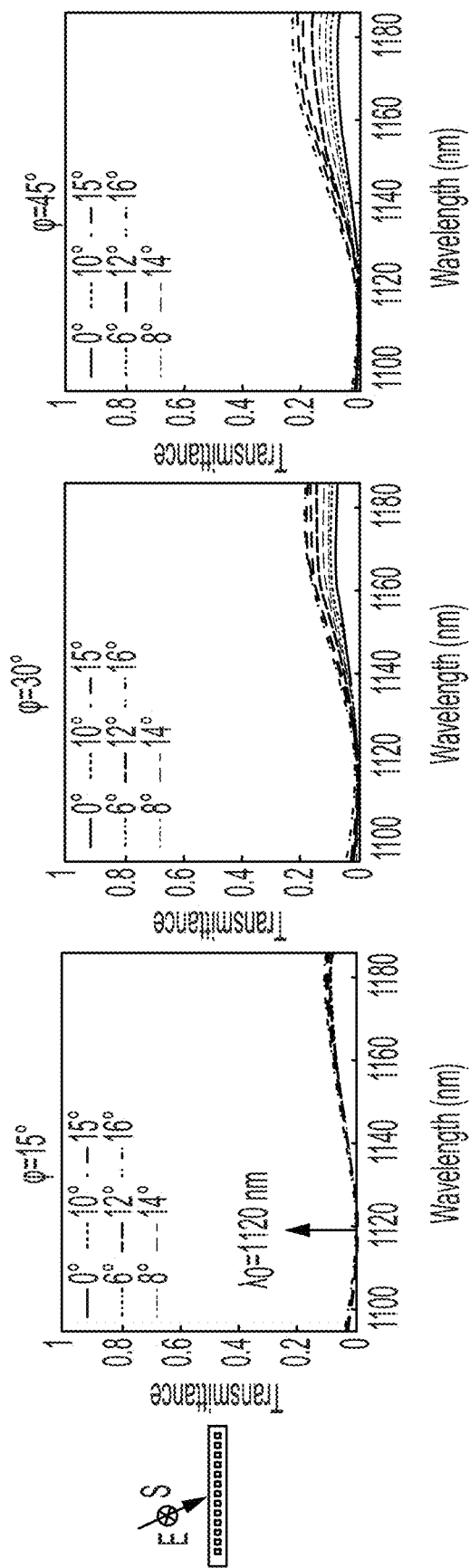
FIGS. 2J-2K are transmission spectra at various azimuthal angles in the horizontal plane ranging from 15° to 45° for s- and p-polarization input suitable for implementing the several embodiments of the disclosure.
Figure 2K:
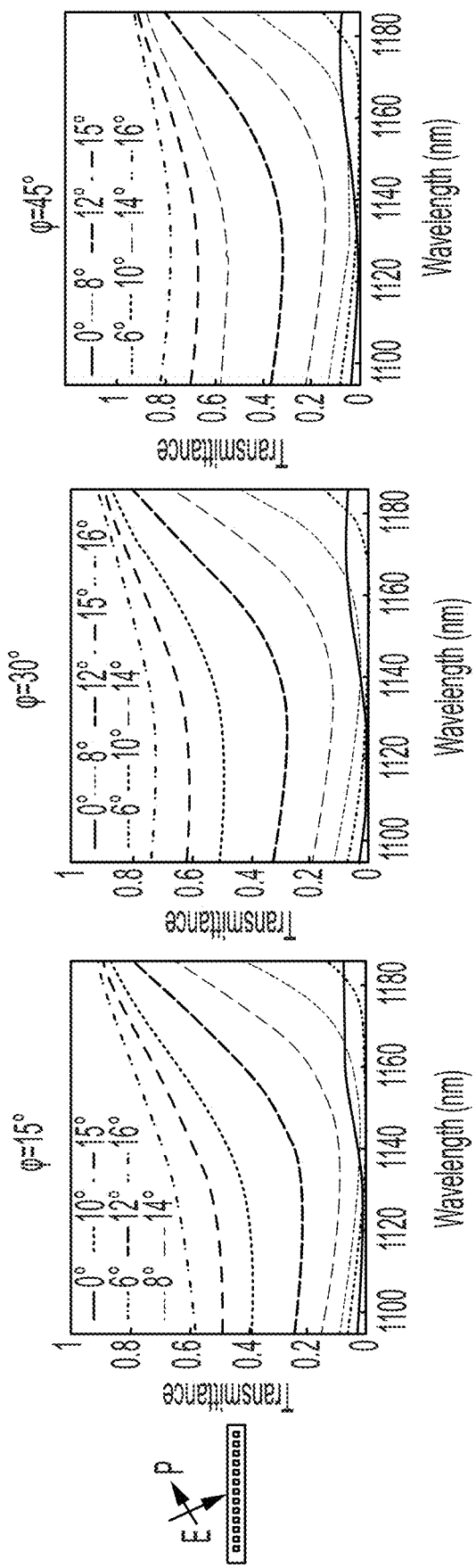
Figure 2L:
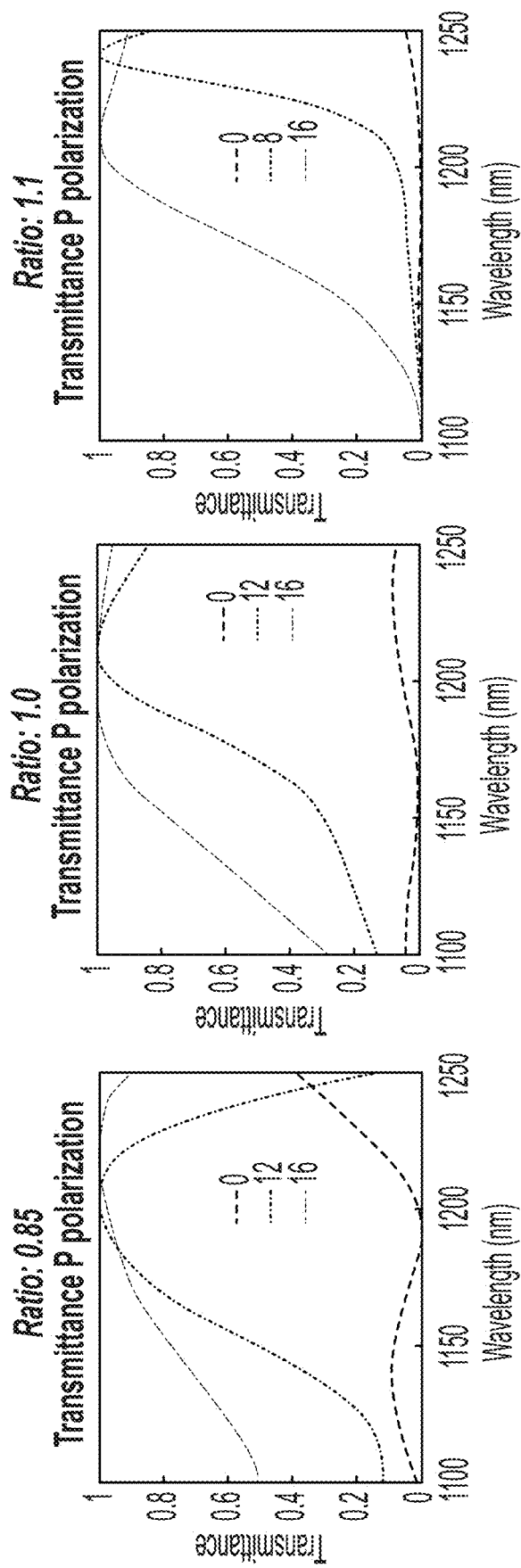
FIGS. 2L-2N are transmission spectra showing structural tolerances of the height, width, and length in the photonic crystal suitable for several embodiments of the disclosure.
Figure 2M:
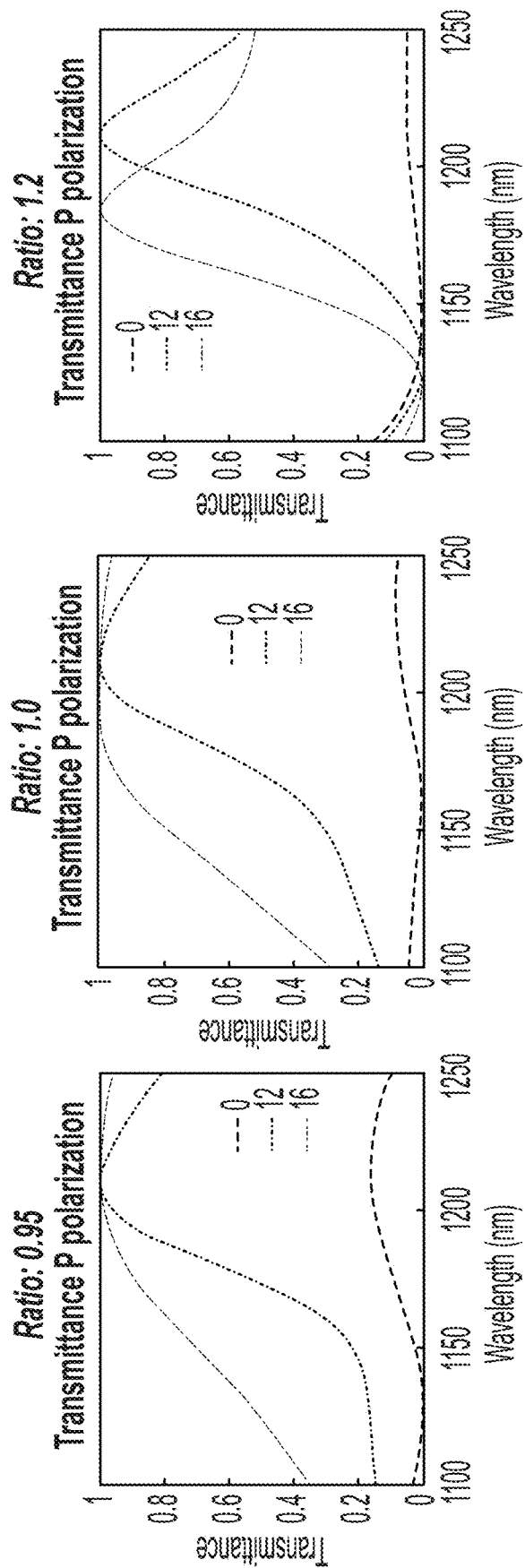
Figure 2N:
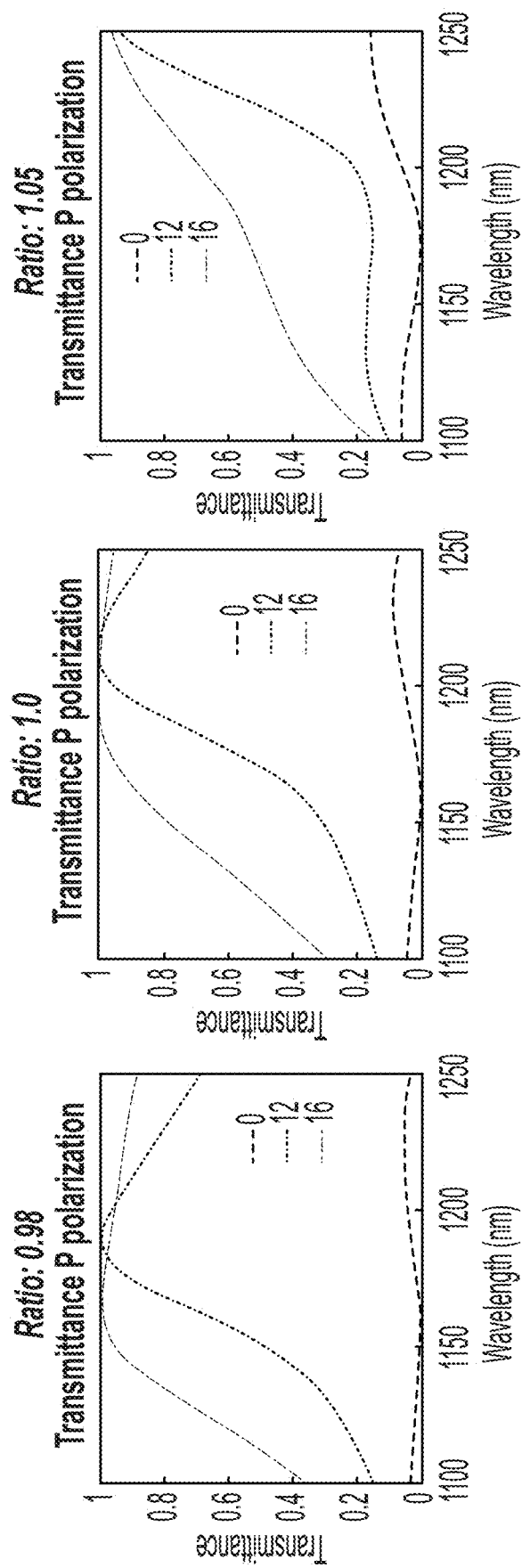

FIGS. 2G-2I show the measured back focal plane imaging and the transfer function |H(k$_x$)| along the φ=0° (Γ-X) and φ=45° azimuthal plane (Γ-M). FIG. 2G shows the measured back focal plane images without and with the nanophotonic differentiator. FIG. 2H-2I show an extracted 1D modulated transfer function along φ=0° and 45°. Along the Γ-X direction, the transfer function matches with the fitted parabolic curve over an NA=0.305. Although the Fourier imaging indicates a non-isotropic transfer function, the Laplacian transform at φ=45° can still be fitted with a quadratic function up to an NA=0.28. FIGS. 2J-2K show transmission spectra at various azimuthal angles, where φ and θ correspond to in-plane and out-of-plane azimuthal angles, respectively. The transmission spectra for the in-plane azimuthal angle φ ranging from 15° to 45° for s- (FIG. 2J) and p-polarization (FIG. 2K) input. The near-zero transmission at λ=1120 nm for s-polarization indicate that no polarization conversion occurs for the transmitted light. FIGS. 2L-2N are transmission spectra showing structural tolerances of the height 116, width 118, and length 120 in the photonic crystal 102.

Figure 3A:
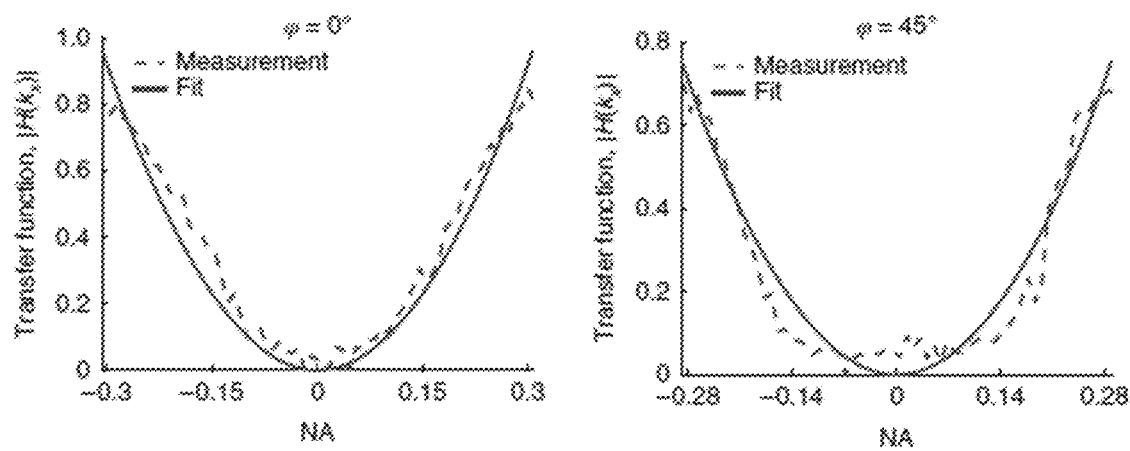
FIG. 3A is a schematic of an imaging set-up for differentiator resolution characterization suitable for implementing the several embodiments of the disclosure.
Figure 3A:
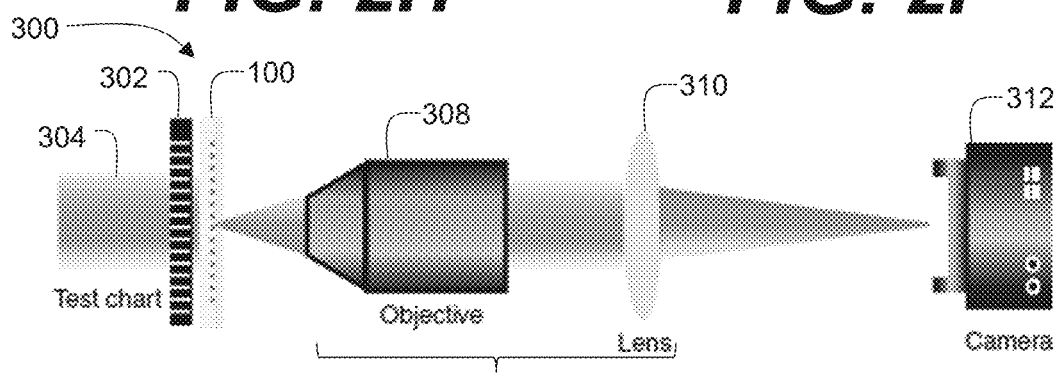
Figure 3B:
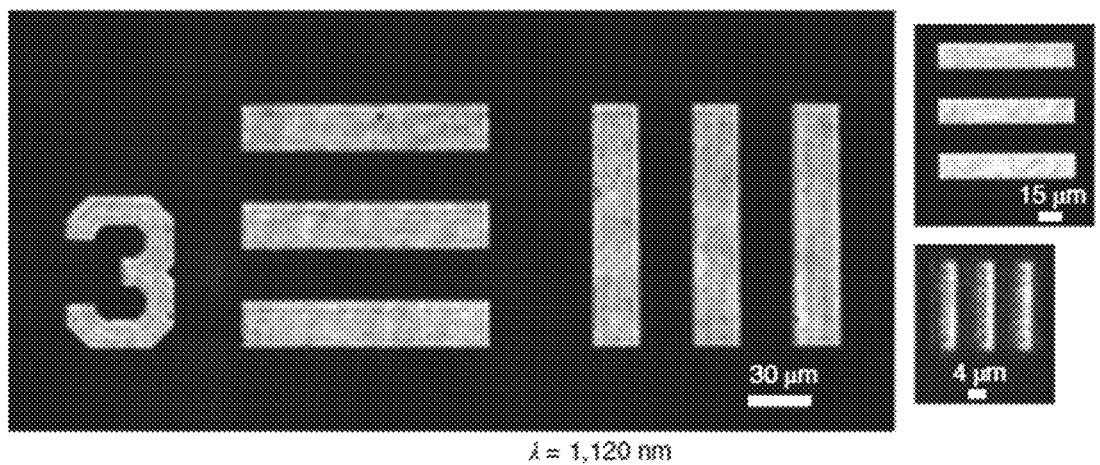
FIGS. 3B-3C are imaging results for the target without and with the differentiator suitable for implementing the several embodiments of the disclosure.
Figure 3C:
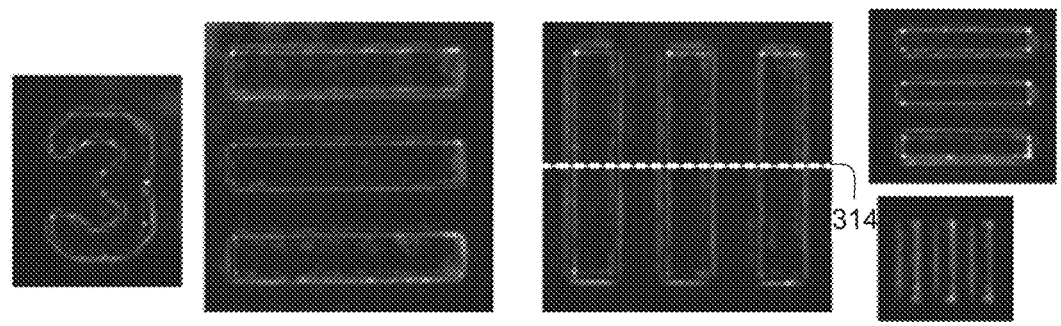
Figure 3D:
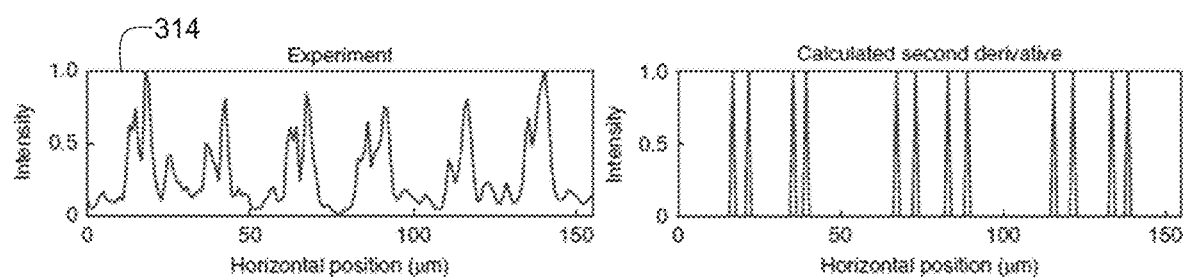
FIG. 3D is a horizontal cut through of the image in FIG. 3C compared to the calculated second-order derivative calculated by the Laplacian of Gaussian filter suitable for implementing the several embodiments of the disclosure.
Figure 3E:
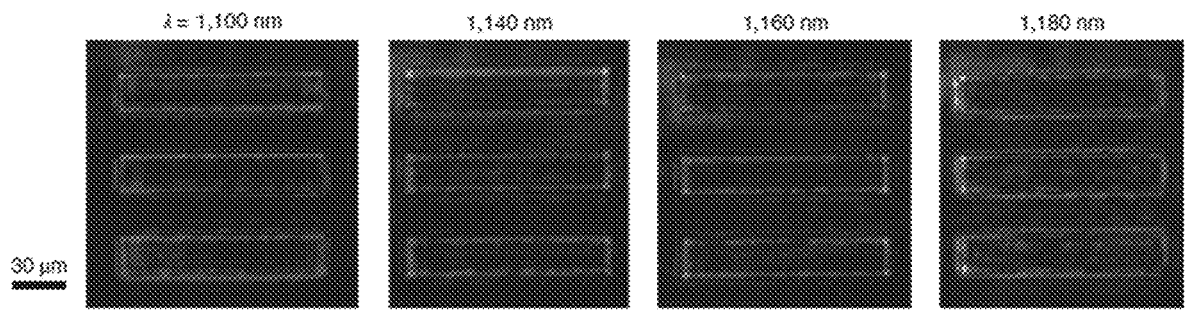
FIG. 3E is edge detection results at different wavelengths ranging from 1,100 nm to 1,180 nm suitable for implementing the several embodiments of the disclosure.

To experimentally quantify the resolution, the nanophotonic differentiator 100 was used to detect the edges of a 1951 USAF resolution test chart 302. A schematic of an imaging set-up 300 for quantifying the resolution of the differentiator 100 is shown in FIG. 3A. The test chart 302 was illuminated using unpolarized and collimated light 304 with a wavelength of 1,120 nm. Unlike previous experimental work, in this case no polarizers are needed to implement image differentiation, which further reduces the system footprint and complexity. That is, because the differentiator 100 is reflective for s-polarized light, there is no need to include a polarizer in the imaging set-up 300. The differentiator 100 was placed directly in front of the test chart 302, which was then imaged through a magnification system 306 comprising an objective 308 paired with a tube lens 310 and a near-infrared camera 312. The imaging results without the differentiator 100 for element sizes ranging from 30 μm to 4 μm are shown in FIG. 3B. FIG. 3C shows the images of the test chart 302 after being passed through the differentiator 100. The edges of the micrometer-scale elements are clearly revealed along both horizontal and vertical directions, which indicates 2D spatial differentiation with a resolution smaller than 4 μm. FIG. 3D shows a horizontal-cut intensity distributions 314 through the differentiated images in FIG. 3C (white dashed line), compared to the second-order derivative based on the Laplacian of Gaussian filter. Due to the nature of the second-order derivative, two closely spaced peaks are formed around each edge, which can be observed from both the calculation and measurement. It is also important to note that the differentiator can operate over a relatively broad band due to the low quality factor resonance away from the BIC state (for details of modulation transfer functions at other wavelengths see FIGS. 7A-7F). FIGS. 7A-7F are modulated transfer function |H(k)| and the quadratic fitting between 1100 and 1180 nm. Although the differentiator is not an ideal Laplacian operator away from the designed wavelength, the images in FIG. 3E indicate that it can still be used for edge discrimination across a bandwidth from 1,100 and 1,180 nm.

Figure 3F:
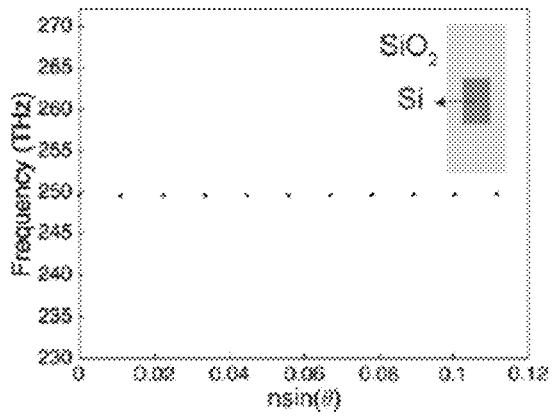
FIG. 3F is a band structure along the Γ–X direction suitable for implementing the several embodiments of the disclosure.

Calculation of Angularly-Dependent Transmission Using Temporal Coupled-Mode Theory To verify the excitation of the quasi-guided mode as the primary mechanism for the angular-dependent transmission, a quasi-analytical coupled mode model is used to calculate the transmission amplitude of the differentiator 100. This model is based on the interference between a direct transmission pathway and an indirect pathway which is due to the quasi-guided mode. Further expanding the traditional coupled mode theory to express the transmission coefficient as a function of incident angle:

$$t(\omega, k) = t_d + f \frac{\gamma(k)}{i(\omega - \omega_{QG}) + \gamma(k)}, \qquad \text{Equation (3)}$$

where $t_d$ is the direct transmission coefficient and ω is the incident frequency, $\omega_{QG}$ is the center frequency and γ(k) is the radiative linewidth of the quasi-guided mode. This quasi-guided mode becomes a BIC at normal incidence with γ(k)=0. f is the complex amplitude constrained by energy conservation and time-reversal symmetry, which can be expressed as:

$$f = -(t_d \pm r_d), \qquad \text{Equation (4)}$$

where $r_d$ is the direct reflection coefficient. Calculations of $t_d$ and $r_d$ are performed using full-wave simulations at normal incidence where the linewidth (γ(k)) goes to zero. As illustrated in the inset of FIG. 3F, $t_d$ is near-zero at normal incidence over the frequency band of interest due to the presence of Mie resonances, which is further illustrated in the s-polarization transmission plot in FIG. 1C. In the model presented herein, it is assumed that $t_d$ remains near-zero as a function of in-plane wavevector (k). While this assumption cannot be directly verified, it is seen that there is excellent agreement between the analytical and full-wave results. This assumption is also supported by the fact that transmission for s-polarization does remain near-zero as a function of k (FIG. 1C).

Next, to extract γ(k) the quality factor, Q(k), can be used, which is retrieved using the Harminv tool of Meep by directly exciting the quasi-guided modes inside the photonic crystal 102 as a function of k. The radiative linewidth γ(k) can then be determined using $$\omega_{QG}/Q(k). \quad \text{Equation (5)}$$

Figure 3G:
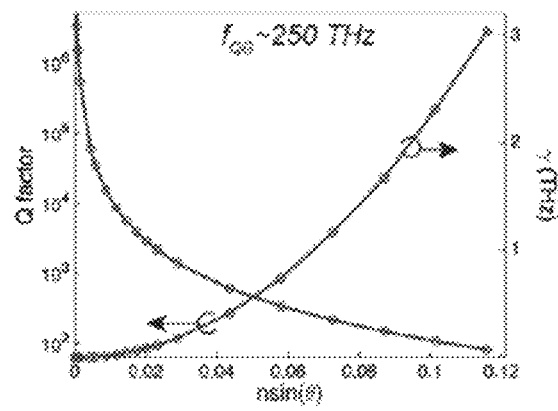
FIG. 3G is a retrieved Q factor and radiative linewidth as a function of NA suitable for implementing the several embodiments of the disclosure.

FIG. 3F shows the band structure obtained from Meep, indicating an invariant position of $\omega_{QG}$ over an NA (n sin(θ)) of 0.12. The calculation of Q(k) was performed using Harminv. FIG. 3G shows the retrieved Q(k) and γ(k) over the NA ranging from 0 to 0.12, beyond which the Q(k) is below the lifetime threshold of Harminv and becomes intractable. Note that the extracted quality factors are far greater than what is achievable with a Mie resonance in a cylinder verifying that this mode must be quasi-guided. FIG. 3F is a band structure along the Γ–X direction obtained from FDTD. The inset corresponds to a schematic of a unit cell. The Si rod is embedded in a uniform layer of $SiO_2$. FIG. 3G is retrieved Q factor and radiative linewidth (γ) as a function of NA (n sin(θ)).

Figure 3H:
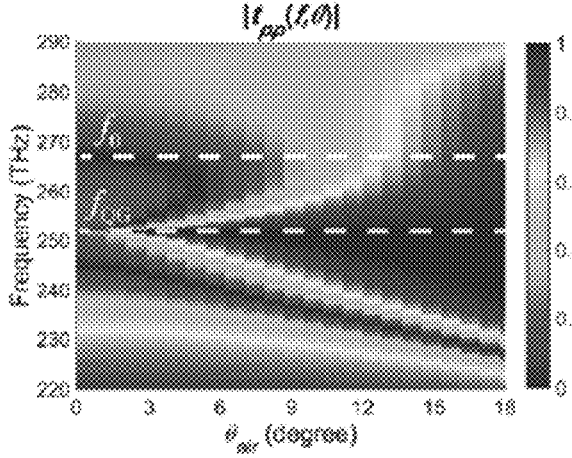
FIG. 3H is a simulated transmission amplitude as a function of frequency and incident angle for p-polarization suitable for implementing the several embodiments of the disclosure.
Figure 3I:
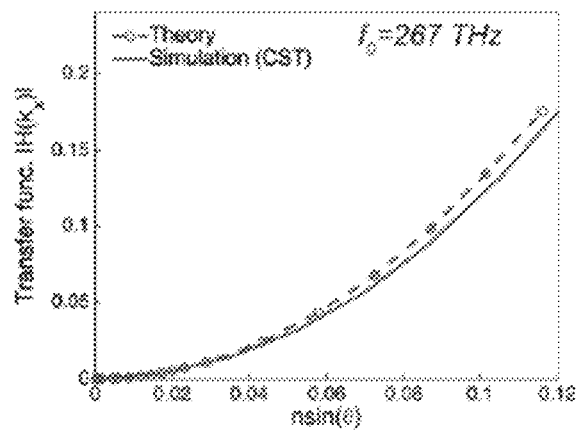
FIG. 3I is a modulation transfer function at the working frequency calculated by theory and full-wave simulation suitable for implementing the several embodiments of the disclosure.

Based on Equation (3), the transfer function at the working frequency ($f_0$ in FIG. 3H) can be plotted as a function of angle using the retrieved γ(k) which is shown in FIG. 3I with a comparison to the full-wave solution. FIG. 3H is a simulated transmission amplitude |t(f, θ)| as a function of frequency and incident angle ($\theta_{air}$) for p-polarization. Note that the use of a uniform $SiO_2$ cladding layer 110 results in a slight shift in the quasi-guided mode and working-frequencies. FIG. 3I is a modulation transfer function at the working frequency ($f_0$) calculated by theory and full-wave simulation.

Figure 3J:
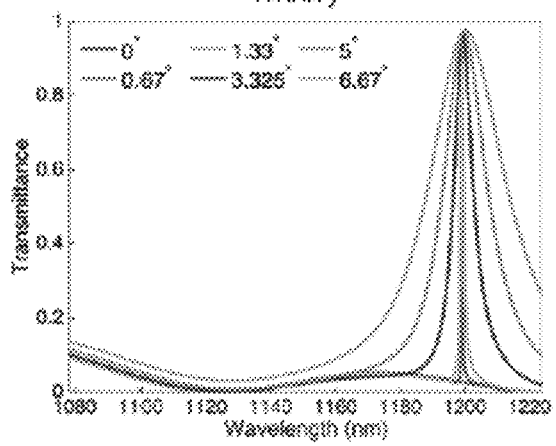
FIGS. 3J-3K are transmission spectra calculated by theory and full-wave simulation suitable for implementing the several embodiments of the disclosure.
Figure 3K:
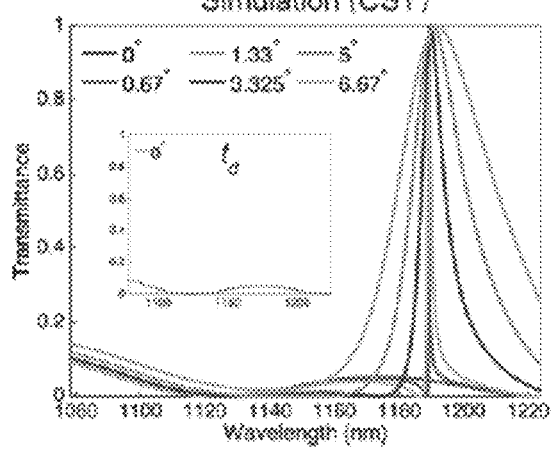

The transmission spectra as a function of frequency and incident angle are provided in FIG. 3J with the full-wave comparison in FIG. 3K. FIGS. 3J-3K are transmission spectra calculated by theory in FIG. 3J and full-wave simulation in FIG. 3K. The inset in FIG. 3K corresponds to the transmission at normal incidence. From FIGS. 3I-3K, it can be observed that the theoretical predictions agree well with the full-wave simulations, indicating the excitation of the quasi-guided modes as the primary mechanism responsible for the angularly-dependent transmission. The theoretical calculation was only performed over a small angle range (~6.67°) due to the intractable Q factor owing to strongly radiative modes. However, due to the smooth variation of transmission beyond 7° and across the frequency range of interest (FIG. 3H) it is reasonable to assume that the quasi-guided modes remain the primary mechanism even at higher angles.

Figure 4A:
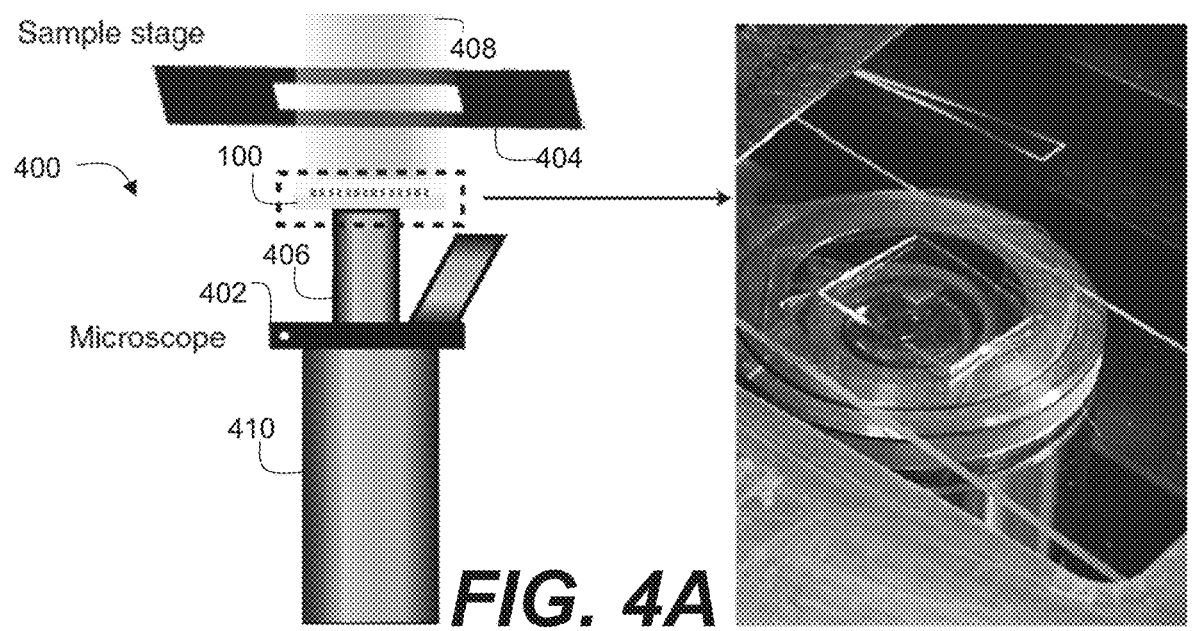
FIG. 4A is a schematic of an edge detection microscope at visible frequencies. suitable for implementing the several embodiments of the disclosure.

FIG. 4A is an edge detection microscope 400 at visible frequencies. One of the primary benefits of flat optics is the ability to vertically integrate them with traditional optical systems. To demonstrate the potential of this approach, an edge detection microscope 400 was built by integrating the image differentiator 100 with a commercial optical microscope 402 (Zeiss Axio Vert.A1). In this case, the nanophotonic differentiator 100 was redesigned for a working wavelength of 740 nm using cylindrical resonators 108 with the width 118 (i.e., diameter) of 180 nm, the length 120 (i.e., period) of 385 nm, and the height 116 of 280 nm. The differentiator has dimensions of 3.5×3.5 mm² and is placed below a sample stage 404 directly on top of the microscope objective 406 (×10). An unpolarized monochromatic laser 408 ($\lambda_0$=740 nm) was used as the light source incident from the top and imaged on a charge-coupled device 410 (CCD; uEye).

Figure 4B:
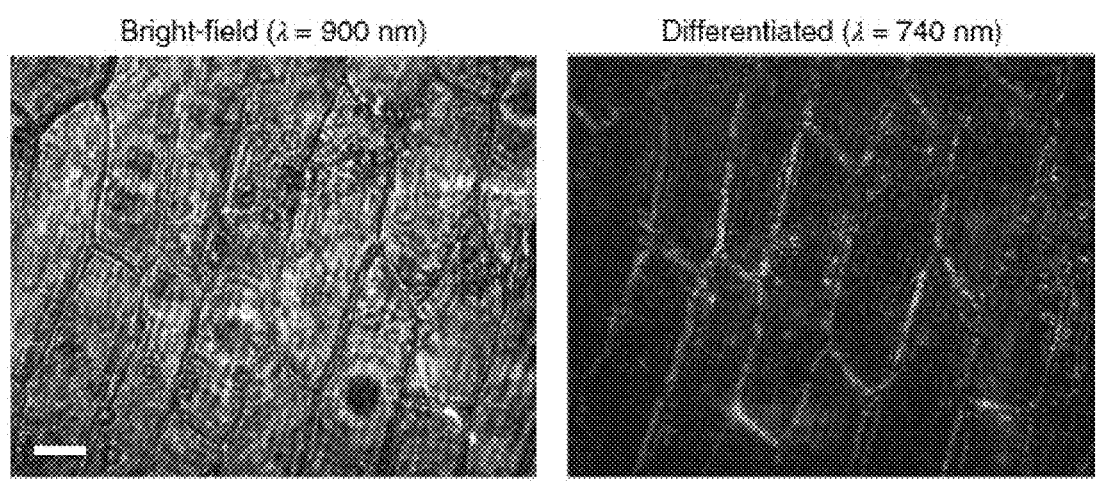
FIGS. 4B-4D are imaging and edge detection results for three types of biological cell samples at a wavelength away from the resonant frequency and at the working wavelength suitable for implementing the several embodiments of the disclosure.
Figure 4C:
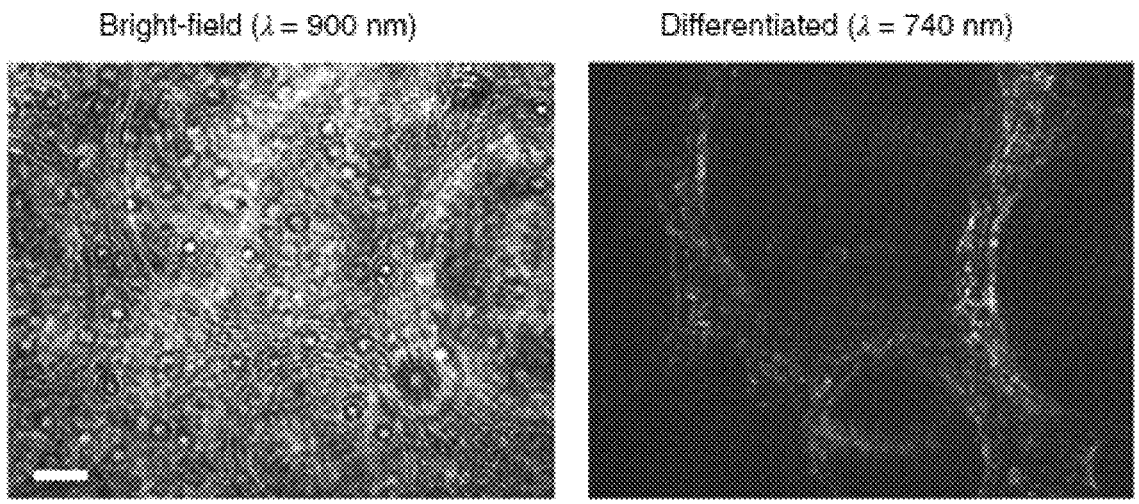
Figure 4D:
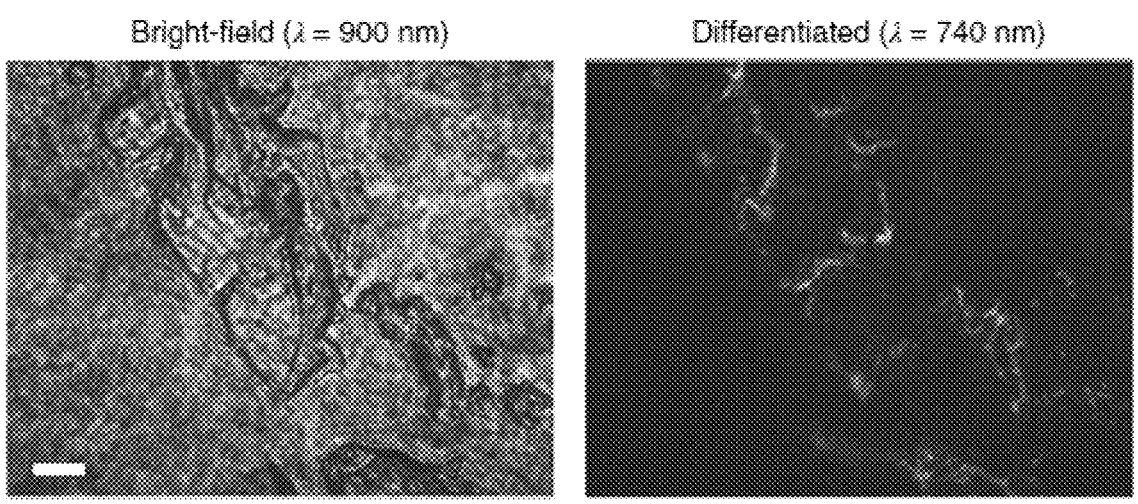

Three types of biological cell were used as the imaging specimen. FIGS. 4B-4D show the imaging and edge detection results of onion epidermis (FIG. 4B), pumpkin stem (FIG. 4C) and pig motor nerve (FIG. 4D). The bright-field images were obtained at a wavelength of λ=900 nm, which is away from the quasi guided resonance. In some implementations, a controller (not shown) can selectively control the light source to produce 900 nm illumination light for capturing bright-field images or to produce 740 nm illumination light for capturing spatially differentiated images. It can be seen that the shapes and boundaries of cells are less discernible due to the transparent nature of the specimen. By switching to the working wavelength of $\lambda_0$=740 nm, clear and high-contrast cell boundaries are shown on the spatially differentiated images on the right.

Here, the size of the differentiator 100 is on the same order, but slightly smaller, than the objective's 406 aperture. This could result in the differentiator acting as a beam block, allowing light at large wavevectors to pass around the edges. To exclude such an effect, a control device was made by placing a field stop around the differentiator while also placing the differentiator close to the cell sample. The results, shown in FIGS. 8A-8F, show that high-contrast cell boundaries are preserved, verifying that the edge enhancement is due to the transfer function of the differentiator. This edge enhancement is similar to dark-field microscopy but without the use of complex components such as a condenser annulus, which has to be aligned in the optical pathway, resulting in significantly reduced system complexity.

Another way in which the differentiator can be used in traditional optical systems is by integration onto a camera sensor. In this case, and in most practical computer vision applications, fabrication at much larger scales is necessary. One potential avenue for scale-up is to employ self-assembly-based nanosphere lithography, which takes advantage of the inherent periodicity and cylindrical unit cell geometry employed here. This method for realizing large-area reflectors is described below with reference to FIG. 5A.

FIG. 5A is flowchart of a fabrication process 500 for a large-scale image differentiator 502 using nanosphere lithography. As shown, a monolayer of nanospheres 504 is formed at the water/air interface 505 of a bath 506 and then transferred to a tilted substrate 508 with a Si film 510, resulting in densely packed nanospheres arranged in a hexagonal lattice 512. The nanospheres 512 are then downsized and used as a dry etch mask for defining the Si nanostructures 514.

Large-Scale Fabrication Using Nanosphere Lithography

In an example, a polystyrene (PS) nanosphere solution (D=740 nm, 10 wt %), obtained from Thermo Fisher Scientific, is first diluted in an equal volume of ethanol by sonication. A Teflon bath 506 is half-filled with deionized water (DI) and a tygon tube 518 is connected to a syringe 520 and held upright with its bevel tip just touching the water surface which allows the formation of a meniscus that helps keep the spheres from falling into the liquid. The sphere solution is then slowly injected onto the water surface at a rate of 5 μL/min by a syringe pump (not shown) to form a monolayer of densely packed nanospheres 504. To facilitate a densely packed film, a perturbation may be added during assembly through a controlled flow (5 L/min) of compressed nitrogen gas using a flat nozzle. Inside the water bath 506, the Si substrate 508 is tilted at 10° to help release the stress and accommodate defects. The densely packed nanosphere film 504 is then transferred to the Si substrate 508 by slowly draining the bath 506. The entire process takes less than 30 minutes to pattern a ~1 cm×1 cm area.

To investigate the feasibility of this technique for realizing the differentiator 100, the differentiator 100 was redesigned for an operational wavelength of 1,450 nm, which corresponds to the width 118 (i.e., a cylindrical rod diameter) of 340 nm, the height 116 of 480 nm and a hexagonal lattice with a period, and therefore the length 120, of 740 nm. This redesign matched the periodicity (length 120) with the size of commercially available nanospheres. The fabrication technique, outlined in detail above, involves using an array of self-assembled nanospheres as an etch mask for the photonic crystal 102. FIG. 5B presents an optical image of a fabricated ~1 cm×1 cm image differentiator 100. The colour variation corresponds to different grain orientations, which does not affect the transmission at different incident angles (for details of the transmission map see FIGS. 9A-9C). The SEM images in FIG. 5C show high-quality Si resonators 108 and a well-defined hexagonal lattice 516 over a large area.

Figure 5G:
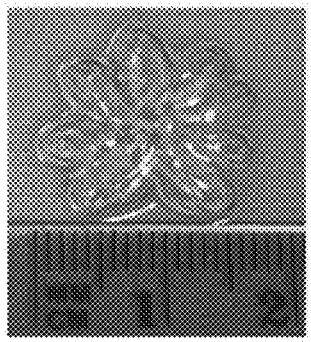
FIG. 5G is an optical image of a second plastic flower mould imaging target suitable for implementing the several embodiments of the disclosure.
Figure 5H:
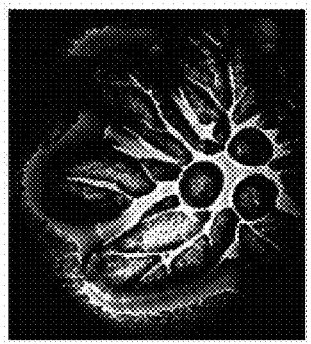
FIG. 5H is bright-field and differentiated results for the second target suitable for implementing the several embodiments of the disclosure.

To mimic a configuration that may be found in a computer vision application, the large-scale spatial differentiator 100 was placed directly in front of a NIR camera detector 550, after the imaging lens 552, as shown in FIG. 5D. For imaging targets transparent centimetre-sized plastic flower moulds were used (FIGS. 5E and 5G) due to their curved surfaces, which scatter light at large angles. FIG. 5E is an optical image of a plastic flower mould, which was used as a 3D macroscopic imaging target FIG. 5G is an optical image of a second plastic flower mould, which was used as a 3D macroscopic imaging target. FIGS. 5F and 5H shows the imaging results with and without the differentiator for two separate objects. FIG. 5F is bright-field and differentiated results for the first plastic flower mould. FIG. 5H is bright-field and differentiated results for the second plastic flower mould. Images on the left and right correspond to systems without and with the differentiator, respectively. Compared to the bright-field images, the edges of the flowers are clearly revealed when applying the differentiator. Although the differentiator is not placed directly on the sensor in this case, there is nothing that would prevent this level of integration in creating a monolithic edge-detecting sensor for computer vision applications.

Finally, although we have showcased vertical integration with convention optics, the imaging system can be further compacted by employing a metalens as the focusing element for realizing an ultrathin and monolithic image-processing system. To create such a device a multilayer metasurface transfer technique is used, which was used for creating doublet lenses and other multilayer metaoptics.

Fabrication of Compound Bilayer Metadevices

A metalens is defined on a $SiO_2$ wafer with a Si device layer using electron beam lithography and reactive ion etching. The pattern is then embedded in an ultrathin polydimethylsiloxane (PDMS) layer by spin coating. The differentiator 100 was defined using the same procedure but before embedding in PDMS, the silicon cylinders were undercut using buffered hydrogen fluoride acid by immersion of the sample for 30 s. The undercut nanorods were then encapsulated in a thicker (~50 μm) layer of PDMS, and released by mechanically peeling of the PDMS. It is worth noting that previously demonstrated sacrificial layer based transfer techniques require longer solvent immersion. The transfer process used here generally applies for uniform arrays. The two layers are then aligned and bonded together using a custom transfer and bonding system.

Figure 6A:
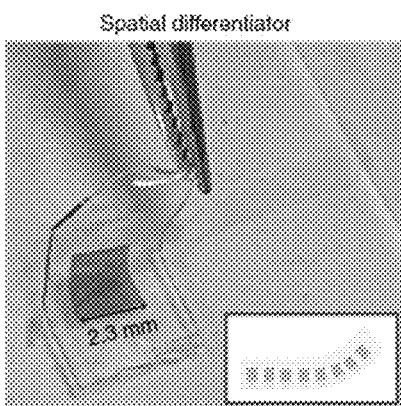
FIGS. 6A-6C are optical images of the nanophotonic differentiator, metalens, and monolithic compound metaoptic system suitable for implementing the several embodiments of the disclosure.
Figure 6B:
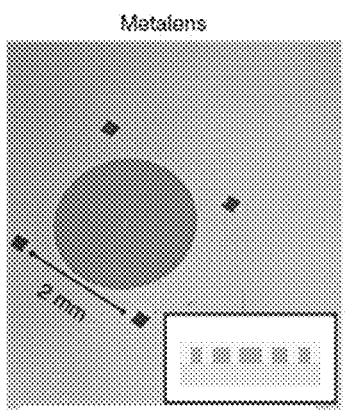
Figure 6C:
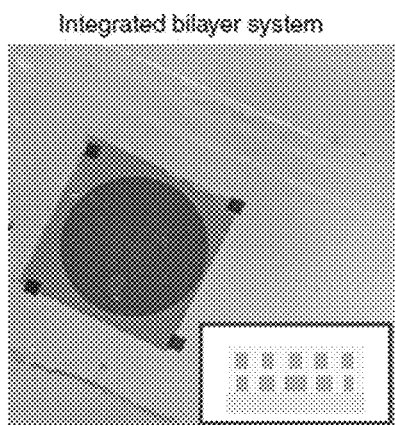
Figure 6D:
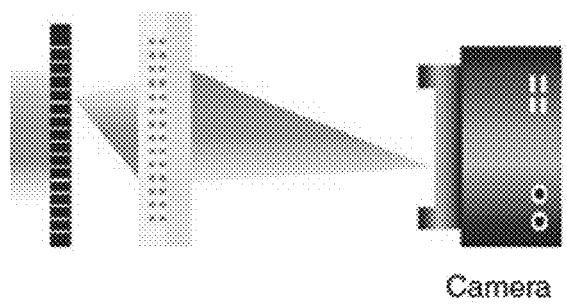
FIG. 6D is a schematic of the imaging set-up with the metaoptic system suitable for implementing the several embodiments of the disclosure.

The metalens and differentiator were designed for operation at $\lambda=1,120$ nm and fabricated on separate wafers (with dimensions of ~2×2 mm2), followed by embedding the structures in polydimethylsiloxane. The differentiator layer was then released from the handle wafer and transferred on top of the metalens. FIGS. 6A and 6B are optical images of the released differentiator and metalens, respectively, which are combined to form the compound monolithic element shown in FIG. 6C. The compound metaoptic is then used as an ultrathin system to image a micrometre-scale target (FIG. 6D). FIG. 6E shows bright-field and differentiated images of onion cells for wavelengths of 1,280 and 1,120 nm, respectively. At the off-resonant wavelength ($\lambda=1,280$ nm) the images are formed without differentiation, while at resonance ($\lambda=1,120$ nm) there is significant edge enhancement for each of the cell walls. In this case there is more noise in the images compared to the experiments employing the differentiator 100 on an objective lens or camera sensor. It is believed that the additional noise can be attributed to the diffractive artefacts from the metalens due to non-unity focusing efficiency, an issue that is slightly exaggerated due to the weaker signal strength after passing through the differentiator 100. This issue can be minimized by optimizing the lens design and fabrication.

In conclusion, a 2D image differentiator 100 with high resolution, thin form factor and a simple geometry that allows rapid and cost-effective large-scale manufacturing has been experimentally demonstrated. Furthermore, how a complete image-processing system can be accomplished using monolithic compound flat optics has been demonstrated. These types of optical analog image processors could open new doors for applications in areas such as biological imaging and computer vision. Metaoptics with a more complex k-space response could also be realized by employing multilayer architectures and inverse design for more complex optical analog computing and image filtering.

Figure 8B:
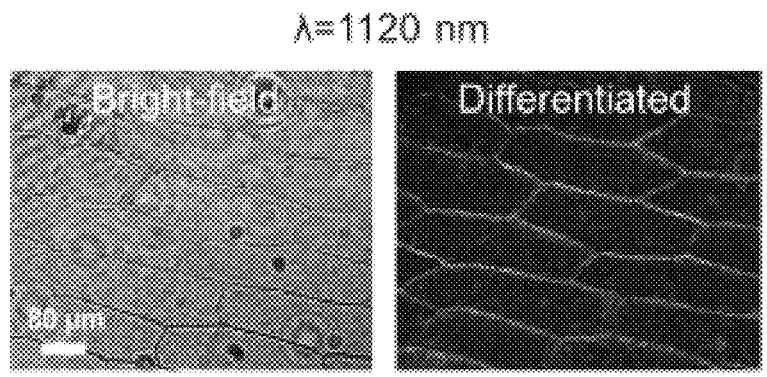
FIG. 8B is bright-field and differentiated images of onion cells at the wavelength of 1120 nm suitable for implementing the several embodiments of the disclosure.
Figures 8C, 8D:
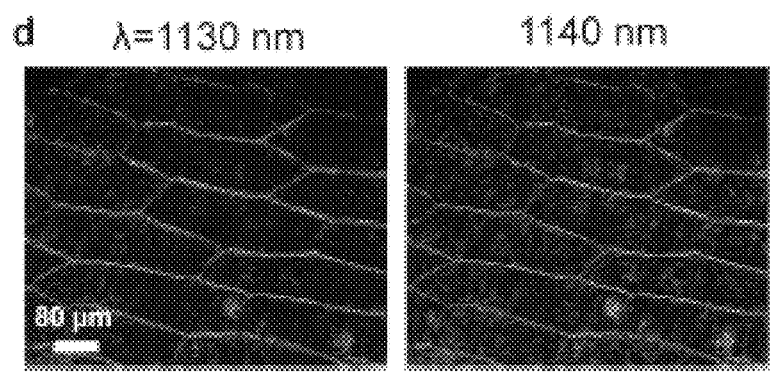
FIGS. 8C-8F are differentiated images of the onion cells at different wavelengths ranging from 1130 nm to 1180 nm suitable for implementing the several embodiments of the disclosure.
Figures 8E, 8F:
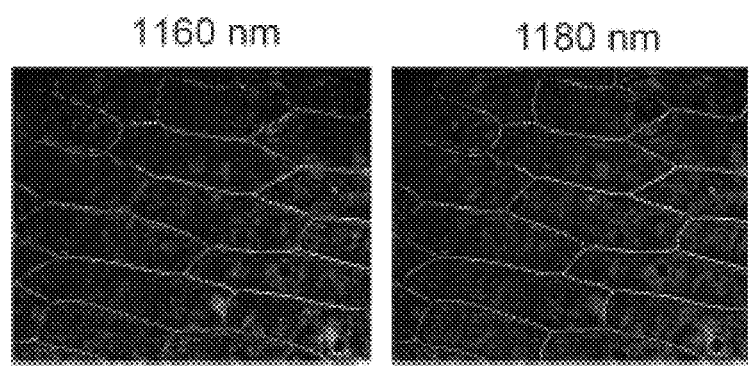

FIG. 8A shows a schematic for a control experiment using the differentiator with a field stop. To exclude the possibility that the differentiator 100 may serve as a beam block in the edge detection microscope 400, the differentiator 100 (2.3× 2.3 mml) is covered with an aperture stop and placed close to the cell sample. FIG. 8B is bright-field and differentiated images of onion cells at the wavelength of 1120 nm. FIGS. 8C-8F are differentiated images at different wavelengths ranging from $\lambda==1130$ nm to 1180 nm.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A flat photonic differentiator, comprising:
a substrate;
a photonic crystal comprising a two-dimensional array of resonators positioned on the substrate, wherein each of the resonators has a first refractive index, a width, a height, and is centered in a unit cell of the substrate with a length; and a cladding layer with a second refractive index positioned on the substrate, wherein the resonators are embedded within the cladding layer, wherein the width, the height, the length, the first refractive index, and the second refractive index are configured to realize an optical transfer function in transmitted light through the photonic differentiator to produce a spatially differentiated image, wherein the width, height, length, first refractive index, and second refractive index are related by $$[D, a, h] = \left(\frac{\lambda_0}{n_{avg}}\right) * [i, j, k],$$

where D is the width, a is the length, h is the height, $\lambda_0$ is a free space wavelength of a working wavelength of the differentiator, $n_{avg}$ is an average of the first refractive index and the second refractive index, and i, j, and k are dimensional constants for the width, length, and height, respectively.

2. The flat photonic differentiator of claim 1, wherein [i, j, k]=[0.63, 1.35, 0.99], and wherein each of $\lambda_0$, $n_{avg}$, i, j, and k have a tolerance of +/−20%.

3. The flat photonic differentiator of claim 1, wherein the spatially differentiated image is a second-order derivative of an input image received by the photonic differentiator.

4. The flat photonic differentiator of claim 1, wherein the photonic crystal has a numerical aperture greater than 0.3.

5. The flat photonic differentiator of claim 1, wherein the photonic crystal does not perform polarization conversion for the transmitted light.

6. The flat photonic differentiator or claim 1, wherein the photonic crystal supports quasi-guided modes for p-polarized incident light.

7. The flat photonic differentiator of claim 6, wherein the photonic crystal reflects s-polarized incident light.

8. The flat photonic differentiator of claim 1, wherein the photonic crystal transmits a brightfield image of incident light with a wavelength more than a threshold difference than the working wavelength.

9. The flat photonic differentiator of claim 1, wherein the working wavelength is one or more wavelengths within a range of 100 nm of each other.

10. The flat photonic differentiator of claim 1, wherein the cladding layer is air.

11. The flat photonic differentiator of claim 1, wherein a cross-sectional shape of each of the resonators is selected from the group consisting of: a circle, a hexagon, a square, a triangle, and a regular polygon.

12. An imaging system, comprising:
an illumination source configured to selectively transmit illumination light at a first wavelength; and
a photonic differentiator positioned to receive light of a scene illuminated by the illumination light, wherein the photonic differentiator comprises:
a substrate;
a photonic crystal comprising a two-dimensional array of resonators positioned on the substrate, wherein each of the resonators has a first refractive index, a width, a height, and is centered in a unit cell of the substrate with a length; and
a cladding layer with a second refractive index positioned on the substrate, wherein the resonators are embedded within the cladding layer, wherein the width, height, length, first refractive index and second refractive index are configured to realize an optical transfer function in transmitted light through the photonic differentiator to produce a spatially differentiated image of the scene when illuminated by illumination light at the first wavelength,
wherein the width, height, length, first refractive index, and second refractive index, are related by $$[D, a, h] = \left(\frac{\lambda_0}{n_{avg}}\right) * [i, j, k],$$

where D is the width, a is the length, h is the height, $\lambda_0$ is a free space wavelength of a working wavelength of the differentiator, $n_{avg}$ is an average of the first refractive index and the second refractive index, and wherein the first wavelength is the working wavelength, and i, j, and k are dimensional constants for the width, length, and height, respectively.

13. The imaging system of claim 12, further comprising:
an objective of a microscope, wherein the photonic differentiator is positioned between the scene and the objective.

14. The imaging system of claim 12, further comprising:
an image sensor configured to capture the spatially differentiated image of the scene, wherein the photonic differentiator is positioned between the scene and the image sensor.

15. The imaging system of claim 12, wherein the illumination source is configured to selectively transmit illumination light at either the first wavelength or a second wavelength, wherein the photonic crystal transmits a brightfield image of the scene when illuminated by the illumination light with the second wavelength.

16. The imaging system of claim 15, further comprising:
a controller configured to cause the illumination source to selectively transmit illumination light of the first wavelength to produce the spatially differentiated image and configured to cause the illumination source to selectively transmit illumination light of the second wavelength to produce the brightfield image.

17. The imaging system of claim 12, wherein [i, j, k]=[0.63, 1.35, 0.99], and wherein each of $\lambda_0$, $n_{avg}$ i, j, and k have a tolerance of +/−20%.

18. The imaging system of claim 12, wherein the photonic crystal supports quasi-guided modes for p-polarized incident light, and wherein the photonic crystal reflects s-polarized incident light.

* * * * *